United States Patent
Pmsvvsv et al.

(10) Patent No.: US 11,848,559 B2
(45) Date of Patent: Dec. 19, 2023

(54) POWER MANAGEMENT IN FUEL CELL SYSTEM BASED MICROGRIDS

(71) Applicant: BLOOM ENERGY CORPORATION, San Jose, CA (US)

(72) Inventors: Prasad Pmsvvsv, Sunnyvale, CA (US); Beau Baker, Sunnyvale, CA (US); Vignan Reddy Bommireddy, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/053,572

(22) Filed: Nov. 8, 2022

(65) Prior Publication Data
US 2023/0146218 A1     May 11, 2023

Related U.S. Application Data

(60) Provisional application No. 63/278,403, filed on Nov. 11, 2021.

(51) Int. Cl.
*H02J 3/38* (2006.01)
*H02J 3/00* (2006.01)

(52) U.S. Cl.
CPC ............. *H02J 3/381* (2013.01); *H02J 3/007* (2020.01); *H02J 2203/10* (2020.01); *H02J 2300/30* (2020.01)

(58) Field of Classification Search
CPC ........ H02J 3/381; H02J 3/007; H02J 2203/10; H02J 2300/30
See application file for complete search history.

(56) References Cited

U.S. PATENT DOCUMENTS

2021/0152016 A1     5/2021   Pmsvvsv et al.

FOREIGN PATENT DOCUMENTS

| CN | 102246379 A | * | 11/2011 | ................ H02J 3/36 |
| WO | WO-2016185661 A1 | * | 11/2016 | |
| WO | WO 2021/236372 A1 | | 11/2021 | |

OTHER PUBLICATIONS

European Office Communication, extended search report from the European Patent Office (EPO) for European Patent Application 22205999, dated Apr. 26, 2023, 7 pages.

* cited by examiner

*Primary Examiner* — Daniel Cavallari
(74) *Attorney, Agent, or Firm* — THE MARBURY LAW GROUP PLLC

(57) ABSTRACT

Excess DC current generated by a fuel cell stack may be provided to a current source inverter, and an AC current may be output by the current source inverter to a grid side bus. The AC current on the grid side bus may be used to support a load demand on a microgrid side bus or provided to a power grid. Various transmission buses and electric conditioning and control devices, such as rectifiers, current source inverters, motors, generators, electric contactors, relays, and/or transfer switches may be configured to use the AC current on the grid side bus to provide an AC current to the microgrid side bus to support the load demand on a microgrid side bus.

20 Claims, 14 Drawing Sheets

POWER MANAGEMENT IN FUEL CELL SYSTEM BASED MICROGRIDS

FIELD

The present disclosure is directed to direct current (DC) power sources, such as fuel cell system based microgrids with more efficient use of fuel cell system capacity.

BACKGROUND

A common method of powering microgrid systems is a Master/Slave voltage source inverter relationship where each voltage source inverter follows a single Master's command to maintain output voltage, meaning that they all export the same amount of voltage.

SUMMARY

According to an embodiment, a microgrid comprises a plurality of direct current (DC) power sources, a plurality of voltage source inverters, wherein a DC end of each of the plurality of voltage source inverters is electrically connected to a respective DC power source of the plurality of DC power sources, a microgrid side bus, wherein an alternating current (AC) end of each of the plurality of voltage source inverters is electrically connected to the microgrid side bus, and the microgrid side bus is configured to be electrically connected to a load, a plurality of current source inverters, wherein a DC end of each of the plurality of current source inverters is electrically connected to a respective DC power source of the plurality of DC power sources, a grid side bus, wherein an AC end of each of the plurality of current source inverters is electrically connected to the grid side bus, a transfer switch configured to control a selective electrical connection of the grid side bus to an electric utility power grid or to the microgrid side bus, and a transmission bus electrically connected between the microgrid side bus and the grid side bus.

According to another embodiment, a method of operating a microgrid comprises providing electric energy from each of a plurality of DC power sources to a respective one of a plurality of voltage source inverters and to a respective one of a plurality of current source inverters, outputting a voltage by the plurality of voltage source inverters to the microgrid side bus such that each of the plurality of voltage source inverters outputs approximately equal amounts of voltage to the microgrid side bus, wherein a maximum output of voltage of each of the plurality of voltage source inverters is based on a lowest generation capacity of one of the plurality of DC power sources, outputting a first current by the plurality of current source inverters to a grid side bus based on an amount of current generated by the plurality of DC power sources in excess of the lowest generation capacity, and using the first current output to the grid side bus to provide a second current to the microgrid side bus.

DETAILED DESCRIPTION

Figure 1:
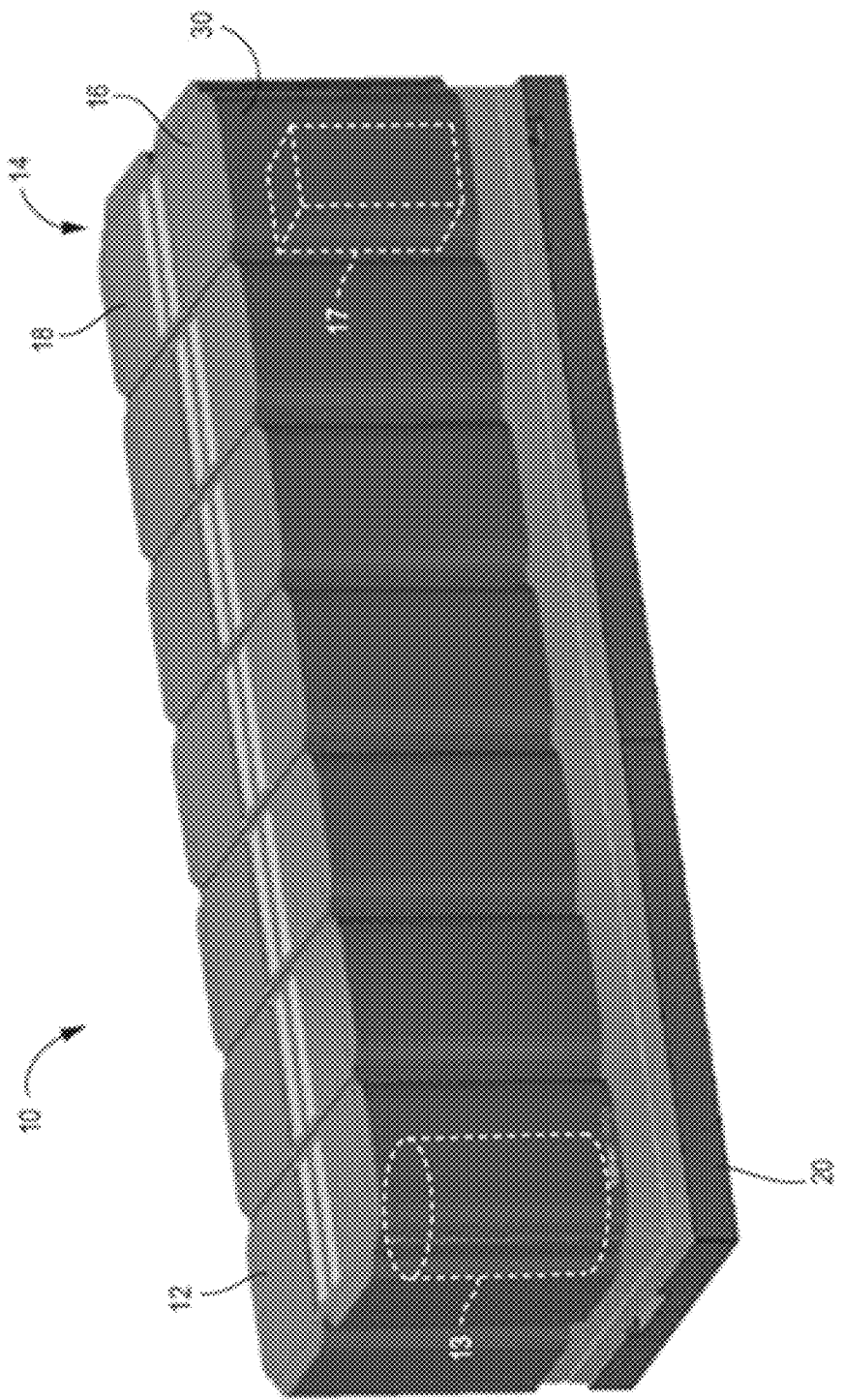
FIG. 1 is a perspective view of a fuel cell system according to various embodiments suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "DC power source" and "DC power supply" are used interchangeably to refer to a generator capable of generating electric power from any source, such as a fuel cell, a combustion generator, a photovoltaic cell, a concentrated solar system, a wind turbine, a geothermal turbine, a hydroelectric turbine, a gas turbine, a nuclear reactor, an alternator, an induction generator, etc. Examples herein described in terms of fuel cells do not limit the scope of the claims and descriptions to such types of DC power sources. In some embodiments, a DC power source may be an AC generator in combination with an AC/DC rectifier.

As used herein, the term "storage system" and "energy storage system" are used interchangeably to refer to any form of energy storage that may be converted to electric power, such as electrical storage, mechanical storage, electromechanical storage, electrochemical storage, thermal storage, etc. Examples may include a battery, a capacitor, a supercapacitor, a flywheel, a liquid reservoir, a gas reservoir, etc. In some embodiments, the energy storage system may include any combination of components configured to control electric energy output of the energy storage system, such as an electric connection device and/or an electric energy conditioning device, in response to a signal from a controller and/or an electric energy bus.

As used herein, the terms "electric energy" and "electric energy output" are referred to amounts of electric voltage, current, or power. Examples herein described in terms of voltage do not limit the scope of the claims and descriptions to such types of electric energy and electric energy output.

The present inventors realized that a weakness of the prior art Master/Slave control scheme is that voltage source inverters of different or variable direct current (DC) power capacity are difficult to completely utilize. Since each voltage source voltage source inverter follows the same single command, the DC power source with the weakest DC capacity tends to limit the ultimate capacity of multiple inverters connected in parallel. This wastes the excess electric energy generated by the DC power sources which is in excess of the electric energy generated by the weakest DC power source in a microgrid.

Various embodiments include electrical circuits, electrical components, and methods for power management in DC power source based microgrids which utilizes both voltage and current source inverters for a plurality of DC power sources. The current source inverters may output excess electric energy generated by the DC power sources other than the weakest DC power source in the microgrid. Therefore, the excess electric energy is not wasted and is provided to a power grid and/or to a load.

In one embodiment, the DC power sources in a microgrid may comprise fuel cell DC power sources. A fuel cell system based microgrid may include multiple direct current (DC) to alternating current (AC) voltage source inverters electrically connecting multiple fuel cell stacks, (or multiple columns of fuel cell stacks and/or multiple power modules each containing plural columns) of a fuel cell system to a microgrid bus in parallel, multiple DC to AC current source inverters electrically connecting the fuel cell stacks to a grid bus in parallel, and at least one electric energy control device configured to control electrical connection between the grid bus and the microgrid bus. Methods for power management in fuel cell system based microgrids may include controlling the current source inverters to output excess electric energy generated by the fuel cell stacks to the grid bus, and controlling the at least one electric energy control device to electrically connect the grid bus and the microgrid bus and provide electric energy from the grid bus and the microgrid bus to support a load.

For microgrid applications, inverters are used to form voltage without any connection to an electric utility power grid. In order to accomplish this, a microgrid system monitors the output voltage and adjust the power of its voltage source inverters in real-time to ensure the voltage waveform remains constant. One common method to accomplish this goal is to have a single point sensor monitoring the output voltage, and providing a control signal to a bank of voltage source inverters. This method employs a Master/Slave voltage source inverter relationship where each voltage source inverter follows a single Master's command to maintain output voltage, meaning that they all export the same amount of voltage. The strength of this approach is in its simplicity. The command to the voltage source inverters is derived directly from the voltage signal in real-time, and with tuning any number of voltage source inverters can be used to follow the command allowing for scaling in capacity.

A weakness in this approach is a difficulty in utilizing the full DC electric energy capacity from each DC power source available to every voltage source inverter in use. Because the Master must supply a single command which is given to all inverters, it is useful to think of the command as a percentage of full power. For microgrid systems with variable capacity DC power sources backing them, the DC power available is not fixed and not always 100% of the intended rating. This means that in cases where many DC power sources are attached to individual voltage source inverters connected in parallel, one of those DC power sources will be weakest at any point in time. Since each voltage source inverter follows the same single command, the weakest DC power source limits the ultimate capacity of multiple voltage source inverters in parallel. As the Master commands more and more power from the voltage source inverters, the weakest system will reach its limit first, and that will cause the response of the microgrid system to fail. As such, the capacity of the entire bank of inverters is artificially limited by its weakest individual voltage source inverter's DC power source capacity. In cases with N inverters, a loss of X kW from a single DC source will cause an N*X kW loss of capability to the microgrid system.

Embodiments described herein address the foregoing weaknesses of microgrid systems. In a fuel cell system based microgrid, the fuel cells may provide a fixed amount of continuous DC electric energy. Voltage source inverters may provide the electric energy to the fuel cell system based microgrid following a single voltage control command and current source inverters may export the remaining electric energy to the grid during a normal (i.e., steady-state non-emergency) mode when the grid is available. The voltage source inverters may supply electric energy demanded from the load, and the current source inverters may export whatever electric energy is in excess of what is required to support the load.

The current source inverters may directly measure a voltage present on their terminals from an external source (typically the electric utility power grid) and push current from a DC power source in sync with the voltage waveform. These current source inverters (sometimes called grid-tie or grid-parallel inverters) may arbitrarily generate output current up to whatever electrically connected DC power sources can provide. The current source inverter may be allowed to sense the DC electric energy input from the respective DC power source to determine when that capacity is reached.

Embodiments provide circuit which permits the current source inverters to export excess electric energy produced by the DC power sources (such as fuel cell stacks) to the electric utility power grid and/or to provide electric energy from a grid side bus of the microgrid system to a load connected microgrid side bus of microgrid system. Electric energy may be moved from the grid side bus to the microgrid side bus arbitrarily, and therefore up to 100% utilization of all DC electric energy produced by the DC power sources, such as fuel cell stacks, may become possible.

FIG. 1 illustrates an example of one electrical power generator which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
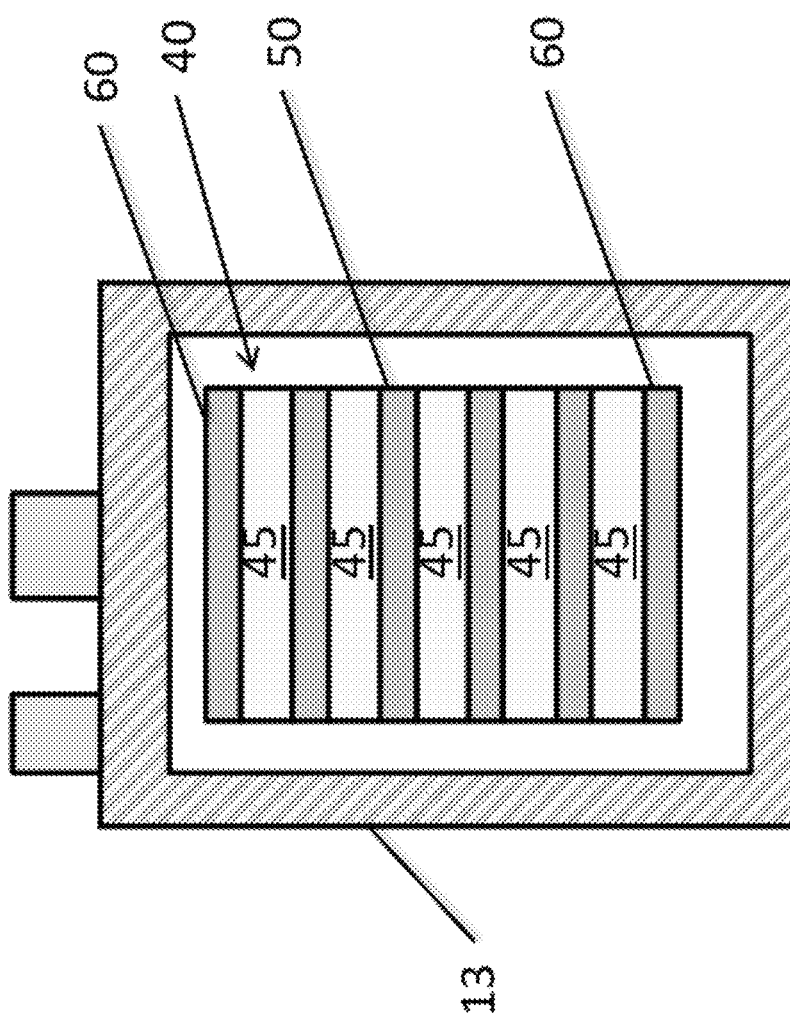
FIG. 2 is a schematic side cross-sectional view of a hot box according to various embodiments suitable for implementing various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non-limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used.

Figure 3:
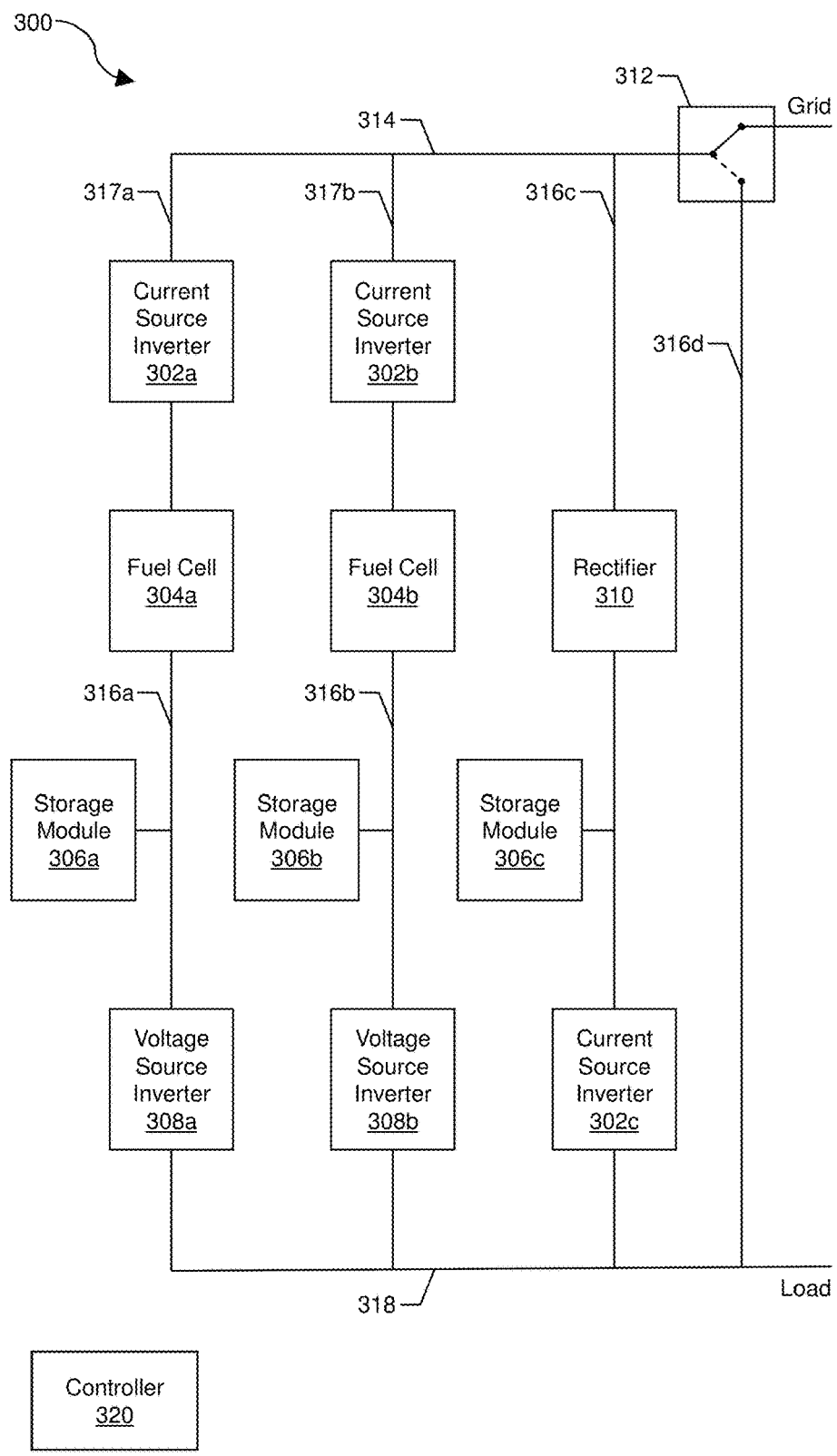
FIG. 3 is a component block diagram of a fuel cell system based microgrid suitable for implementing various embodiments.

FIG. 3 illustrates a fuel cell system based microgrid 300 suitable for implementing various embodiments. With reference to FIGS. 1-3, the fuel cell system based microgrid 300 may include multiple fuel cells 304a, 304b, voltage source inverters 308a, 308b, current source inverters 302a, 302b, 302c, a rectifier 310, a grid side bus 314, a microgrid side bus 318, transmission buses 316a, 316b, 316c, 316d, and a transfer switch 312. In some examples, the fuel cell system based microgrid 300 may also include storage modules 306a, 306b, 306c.

As used herein, each of the fuel cells 304a or 304b may comprise a cell stack or column 40 shown in FIG. 2 or a power module 12 shown in FIG. 1. In other words, a fuel cell 304a or 304b as used below is a single fuel cell power source and is not limited to being a single fuel cell 45 containing one electrolyte, one anode electrode and one cathode electrode. Furthermore, while a fuel cell microgrid 300 is described below, it should be understood that the fuel cells may be replaced with other DC power sources, such as photovoltaic power sources for example.

The fuel cells 304a, 304b may be electrically connected to the microgrid side bus 318 by the voltage source inverters 308a, 308b. The fuel cells 304a, 304b, the voltage source inverters 308a, 308b, and the microgrid side bus 318 may be electrically connected via the transmission buses 316a, 316b. The fuel cells 304a, 304 and thus the voltage source inverters 308a, 308b may be electrically connected to the microgrid side bus 318 in parallel. The fuel cells 304a, 304b may be electrically connected to the grid side bus 314 by the current source inverters 302a, 302b. The fuel cells 304a, 304b, the current source inverters 302a, 302b, and the grid side bus 314 may be electrically connected via the transmission buses 317a, 317b. The fuel cells 304a, 304b and thus the current source inverters 302a, 302b may be electrically connected to the grid side bus 314 in parallel. The grid side bus 314 and the microgrid side bus 318 may be selectively electrically connected to each other by the rectifier 310, the current source inverter 302c, and the transmission bus 316c. The rectifier 310 may be electrically connected to the grid side bus 314 in parallel with the current source inverters 302a, 302b. The current source inverter 302c may be electrically connected to the microgrid side bus 318 in parallel with the voltage source inverters 302a, 302b. The grid side bus 314 and the microgrid side bus 318 may also be selectively electrically connected to each other through a transfer switch 312 and the transmission bus 316d.

In some examples, the fuel cell system based microgrid 300 may also include storage modules 306a, 306b, 306c. For example, the storage modules 306a, 306b, 306c may include any form of energy storage that may be converted to electric power, such as electrical storage, mechanical storage, electromechanical storage, electrochemical storage, thermal storage, etc. Examples may include a battery, a capacitor, a supercapacitor, a flywheel, a liquid reservoir, a gas reservoir, etc. In some examples, the storage modules 306a, 306b, 306c may include any combination of components configured to control electric energy input and output of the storage modules 306a, 306b, 306c, such as an electric connection device and/or an electric energy conditioning device, in response to a signal from a controller 320 and/or an electric energy bus, such as transmission bus 316a, 316, 316c. The storage modules 306a, 306b may be electrically connected to the respective fuel cells 304a, 304b and the respective voltage source inverters 306a, 306b via the transmission buses 316a, 316b. The storage module 306c may be electrically connected in parallel to the rectifier 310 and the current source inverter 302c via the transmission bus 316c.

The storage modules 306a, 306b, 306c may also be electrically connected to microgrid side bus 318 by the transmission buses 316a, 316b, 316c.

The fuel cell system based microgrid 300 may include any number and combination of controllers 320 (e.g., central processing unit (CPU), microcontroller, field programmable gate array (FPGA), application specific integrated circuit (ASIC), or any other software programmable processor) communicatively connected to the fuel cells 304a, 304b, the voltage source inverters 308a, 308b, the current source inverters 302a, 302b, 302c, the rectifier 310, the grid side bus 314, the microgrid side bus 318, the transmission buses 316a, 316b, 316c, 316d, 317a, 317b, the transfer switch 312, and/or the storage modules 306a, 306b, 306c. For example, one or more controllers 320 may be components of the fuel cell system based microgrid 300 communicatively connected to and external to the fuel cells 304a, 304b, the voltage source inverters 308a, 308b, the current source inverters 302a, 302b, 302c, the rectifier 310, the transfer switch 312, and/or the storage modules 306a, 306b, 306c. For another example, one or more controllers 320 may be components of the fuel cell system based microgrid 300 communicatively connected to, and integral to the fuel cells 304a, 304b, the voltage source inverters 308a, 308b, the current source inverters 302a, 302b, 302c, the rectifier 310, the transfer switch 312, and/or the storage modules 306a, 306b, 306c.

The one or more controllers 320 may be configured to provide control signals to and/or directly control functions of the fuel cells 304a, 304b, the voltage source inverters 308a, 308b, the current source inverters 302a, 302b, 302c, the rectifier 310, the transfer switch 312, and/or the storage modules 306a, 306b, 306c. The one or more controllers 320 may be configured to receive signals configured to indicate to the one or more controllers 320 an AC voltage on the grid side bus 314, the microgrid side bus 318, and/or the transmission buses 316a, 316b, 316c, 316d from the voltage source inverters 308a, 308b, the current source inverters 302a, 302b, 302c, the rectifier 310, and/or the transfer switch 312. The one or more controllers 320 may be configured to directly measure an AC voltage on the grid side bus 314, the microgrid side bus 318, and/or the transmission buses 316a, 316b, 316c, 316d, 317a, 317b at the voltage source inverters 308a, 308b, the current source inverters 302a, 302b, 302c, the rectifier 310, the transfer switch 312, the grid side bus 314, the microgrid side bus 318, and/or the transmission buses 316a, 316b, 316c, 316d.

The fuel cells 304a, 304b may be configured to provide DC electric energy to the voltage source inverters 308a, 308b via the transmission buses 316a, 316b. The DC electric energy may be configured as an amount of DC voltage needed to support a load demand of a load (i.e., "load" in FIG. 3) for which the fuel cell system based microgrid 300 is deployed. The amount of DC voltage output by the fuel cells 304a, 304b to the voltage source inverters 308a, 308b may be controlled by a controller 320.

The voltage source inverters 308a, 308b may be configured receive the DC voltage from the fuel cells 304a, 304b, to convert the DC voltage to AC electric energy, and to provide the AC electric energy to the microgrid side bus 318 via the transmission buses 316a, 316b. The AC electric energy may be configured as an amount of AC voltage needed to support at least part of a load demand. The amount of AC voltage output by the voltage source inverters 308a, 308b to the microgrid side bus 318 may be controlled to be a same amount of AC voltage for each of the voltage source inverters 308a, 308b. The amount of AC voltage output by the voltage source inverters 308a, 308b may be limited by a lowest DC voltage generation capacity of one of the fuel cells 304a, 304b. In other words, when the fuel cells 304a, 304b have different capacities for generating DC voltage, the lowest capacity limits the output of AC voltage of the voltage source inverters 308a, 308b electrically connected to the fuel cells 304a, 304b with higher capacity. The amount of AC voltage output by the voltage source inverters 308a, 308b may be controlled by a controller 320.

The fuel cells 304a, 304b may be configured to provide DC electric energy to the current source inverters 302a, 302b via the transmission buses 317a, 317b. The DC electric energy may be configured as an amount of DC voltage generated by the fuel cells 304a, 304b in excess of what is used by the voltage source inverters 308a, 308b. For example, the amount of DC voltage used by the voltage source inverters 308a, 308b may be less than all of the DC voltage generated by the fuel cells 304a, 304b when an equal share of the load demand is less than the lowest DC voltage generation capacity of the fuel cells 304a, 304b. In another example, the amount of DC voltage used by the voltage source inverters 308a, 308b may be less than all of the DC voltage generated by at least one of the fuel cells 304a, 304b when an equal share of the load demand is greater than the lowest DC voltage generation capacity of one of the fuel cells 304a, 304b. The amount of DC voltage output by the fuel cells 304a, 304b to the current source inverters 302a, 302b may be controlled by a controller 320.

The current source inverters 302a, 302b may be configured receive the DC voltage from the fuel cells 304a, 304b, to convert the DC voltage to AC electric energy, and to provide the AC electric energy to the grid side bus 314 via the transmission bus 317a, 317b. The AC electric energy may be configured as an amount of AC current configured to follow a volt-watt curve. The amount of AC current output by the current source inverters 302a, 302b to the grid side bus 314 may be controlled based on various electrical connections of the grid side bus 314. For example, the grid side bus 314 may be selectively electrically connected to an electric utility power grid (i.e., "grid" in FIG. 3) by the transfer switch 312, as described further herein. The current source inverters 302a, 302b may output AC current following a volt-watt curve based on a voltage at the grid side bus 314, the current source inverters 302a, 302b, and/or the transfer switch 312. The AC current on the grid side bus 314 may be exported to the electric utility power grid and/or used to support the load, as described further below. In another example, the grid side bus 314 may be selectively electrically connected to the microgrid side bus 318 by the transfer switch 312 and the transmission bus 316d, as described further below. The current source inverters 302a, 302b may output AC current following a volt-watt curve based on a voltage at the grid side bus 314, the current source inverters 302a, 302b, the transfer switch 312, the transmission bus 316d, the microgrid side bus 318, and/or the voltage source inverters 308a, 308b. The amount of AC current output by the current source inverters 302a, 302b may be controlled by a controller 320.

The transfer switch 312 may be configured to selectively electrically connect the grid side bus 314 to the electric utility power grid or to the microgrid side bus 318 via the transmission bus 316d. The transfer switch 312 may detect availability of the electric utility power grid, for example, by detecting a voltage and/or current level of the electric utility power grid. In response to the electric utility power grid being available in a normal operating mode, the transfer switch 312 may selectively electrically connect the grid side bus 314 to the electric utility power grid and disconnect the grid side bus 314 from the transmission bus 316d. In response to the electric utility power grid being unavailable in an emergency operating mode, the transfer switch 312 may selectively electrically connect the grid side bus 314 to the microgrid side bus 318 via the transmission bus 316d and disconnect the grid side bus 314 from the electric utility power grid. The transfer switch 312 may be controlled by a controller 320.

The rectifier 310 may be configured to draw AC current from the grid side bus 314 via transmission bus 316c in response to a need for more electric energy to support the load demand when the transfer switch 312 selectively electrically connects the grid side bus 314 to the electric utility power grid. The AC voltage output to the microgrid side bus 318 by the voltage source inverters 308a, 308b may be insufficient to support the load demand. To increase the amount of AC voltage provided to the microgrid side bus 318, the rectifier 310 may draw AC current (e.g., grid current and/or inverted fuel cell current) from the grid side bus 314. The rectifier 310 may convert the AC current to a DC current and provide the DC current to the current source inverter 302c via transmission bus 316c. Any remaining AC current at the grid side bus 314 may be exported to the electric utility power grid. In response to the load demand being satisfied by the voltage source inverters 308a, 308b, the rectifier 310 may be configured to not draw AC current from the grid side bus 314, and the AC current at the grid side bus 314 may be exported to the electric utility power grid. The amount of AC current drawn by the rectifier 310 from the grid side bus 314 and the amount of DC current output to the current source inverter 302c may be controlled by a controller 320.

The current source inverter 302c may be configured to receive DC current from the rectifier 310 to convert the DC current to AC electric energy, and to provide the AC electric energy to the microgrid side bus 318 via the transmission bus 316c. The AC electric energy may be configured as an amount of AC current configured to follow a volt-watt curve. The amount of AC current output by the current source inverter 302c to the microgrid side bus 318 may be controlled based on the load demand. For example, the current source inverter 302c may output AC current following a volt-watt curve based on a voltage at the microgrid side bus 318 and/or the voltage source inverters 308a, 308b, and the load demand. The AC current output by the current source inverter 302c may be an amount sufficient to supplement the shortfall of the output of AC voltage of the voltage source inverters 308a, 308b to support the load demand. The amount of AC current output by the current source inverter 302c may be controlled by a controller 320.

The transmission bus 316d may electrically connect the grid side bus 314 and the microgrid side bus 318 when the transfer switch 312 selectively electrically connects the buses 314, 318 during the emergency operating mode. The current source inverters 302a, 302b may be configured to provide the AC current to the grid side bus 314 via the transmission bus 317a, 317b, and the AC current may flow to the microgrid side bus 318 via transmission bus 316d. The amount of AC current output by the current source inverters 302a, 302b to the grid side bus 314 may be controlled based on various electrical connections of the grid side bus 314. The current source inverters 302a, 302b may output AC current following a volt-watt curve based on a voltage at the grid side bus 314, the current source inverters 302a, 302b, the transfer switch 312, the transmission bus 316d, the microgrid side bus 318, and/or the voltage source inverters 308a, 308b. When the transmission bus 316d electrically connects the grid side bus 314 and the microgrid side bus 318, the flow of the AC current from the grid side bus 314 to the microgrid side bus 318 may bypass at least the current source inverter 302c. The amount of AC current output by the current source inverters 302a, 302b may be controlled by a controller 320.

In some examples, the storage modules 306a, 306b, 306c may sink excess electric energy or source extra electric energy when needed to keep the fuel cell system based microgrid voltage stable. For example, when the transfer switch 312 selectively electrically connects the grid side bus 314 and the microgrid side bus 318, the storage modules 306a, 306b, 306c may be used to provide additional electric energy to the microgrid side bus 318 or receive excess electric energy not needed at the microgrid side bus 318. The storage modules 306a, 306b, 306c may keep the fuel cell system based microgrid voltage stable during the transition of the transfer switch 312 from selectively electrically connecting the fuel cell system based microgrid 300 to the electric utility power grid to selectively electrically disconnecting the fuel cell system based microgrid 300 from the electric utility power grid.

Figure 4A:
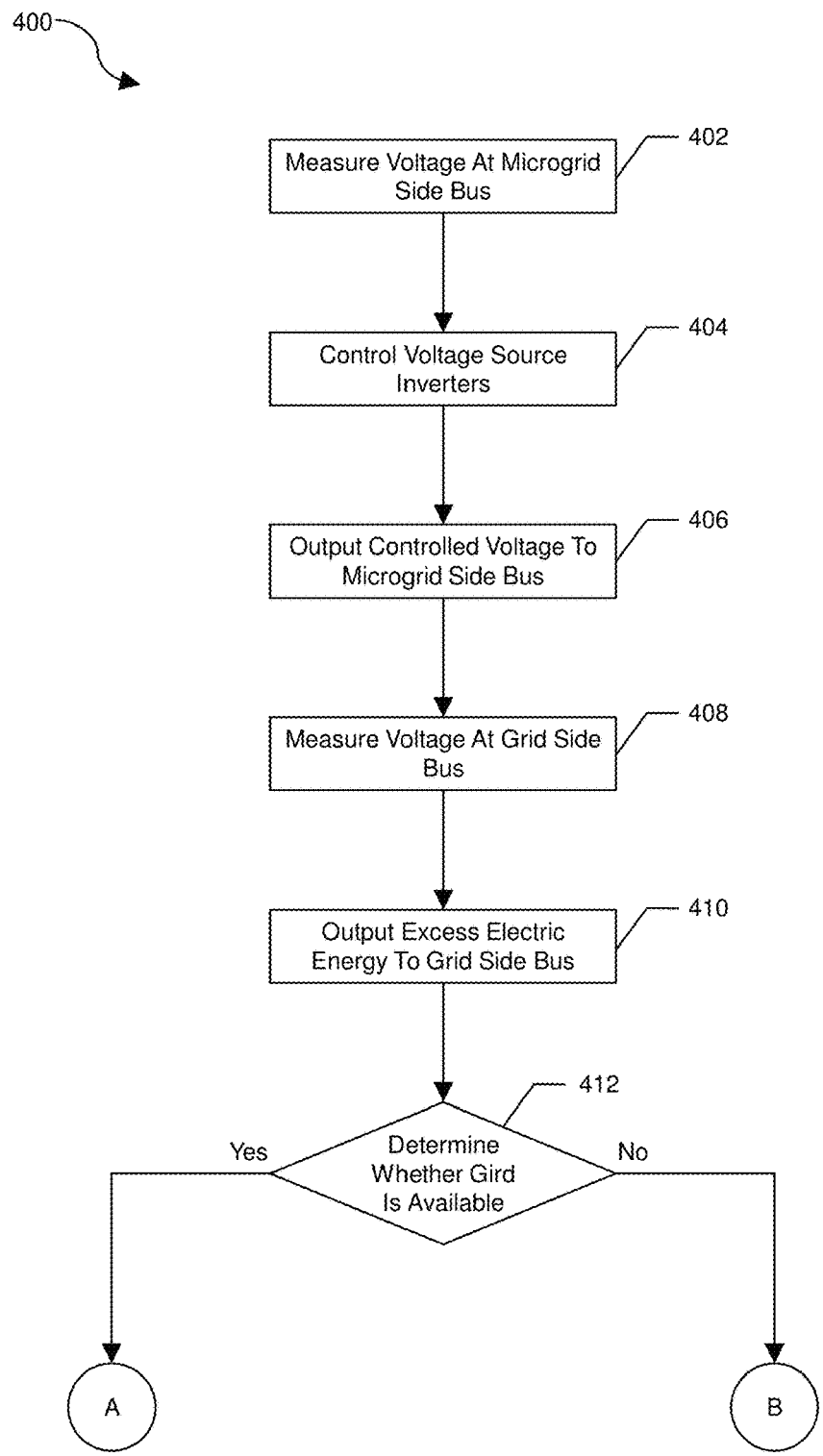
FIGS. 4A-4C are process flow diagrams of a method of power management for the fuel cell system based microgrid illustrated in FIG. 3 according to various embodiments.
Figure 4B:
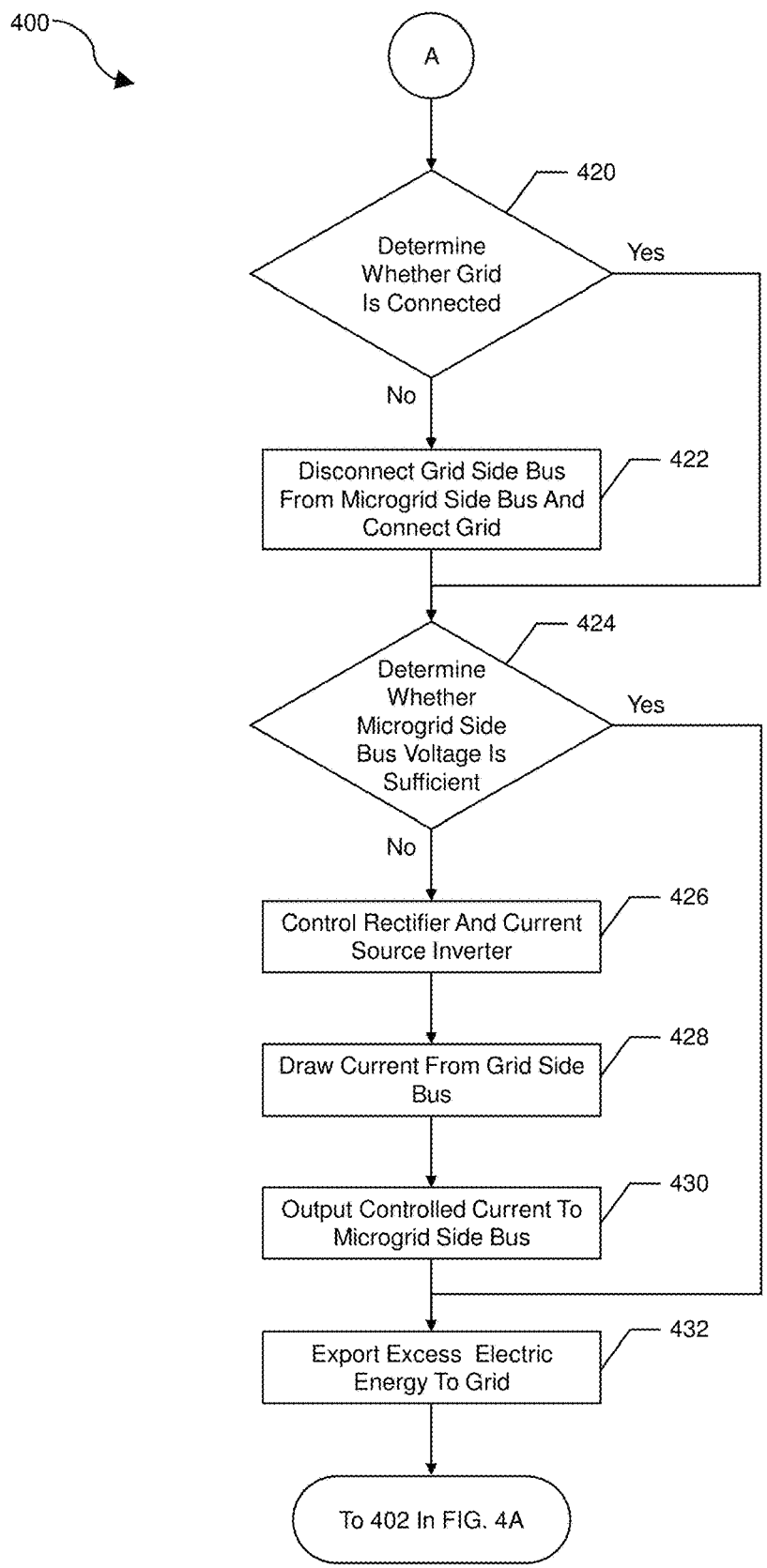
Figure 4C:
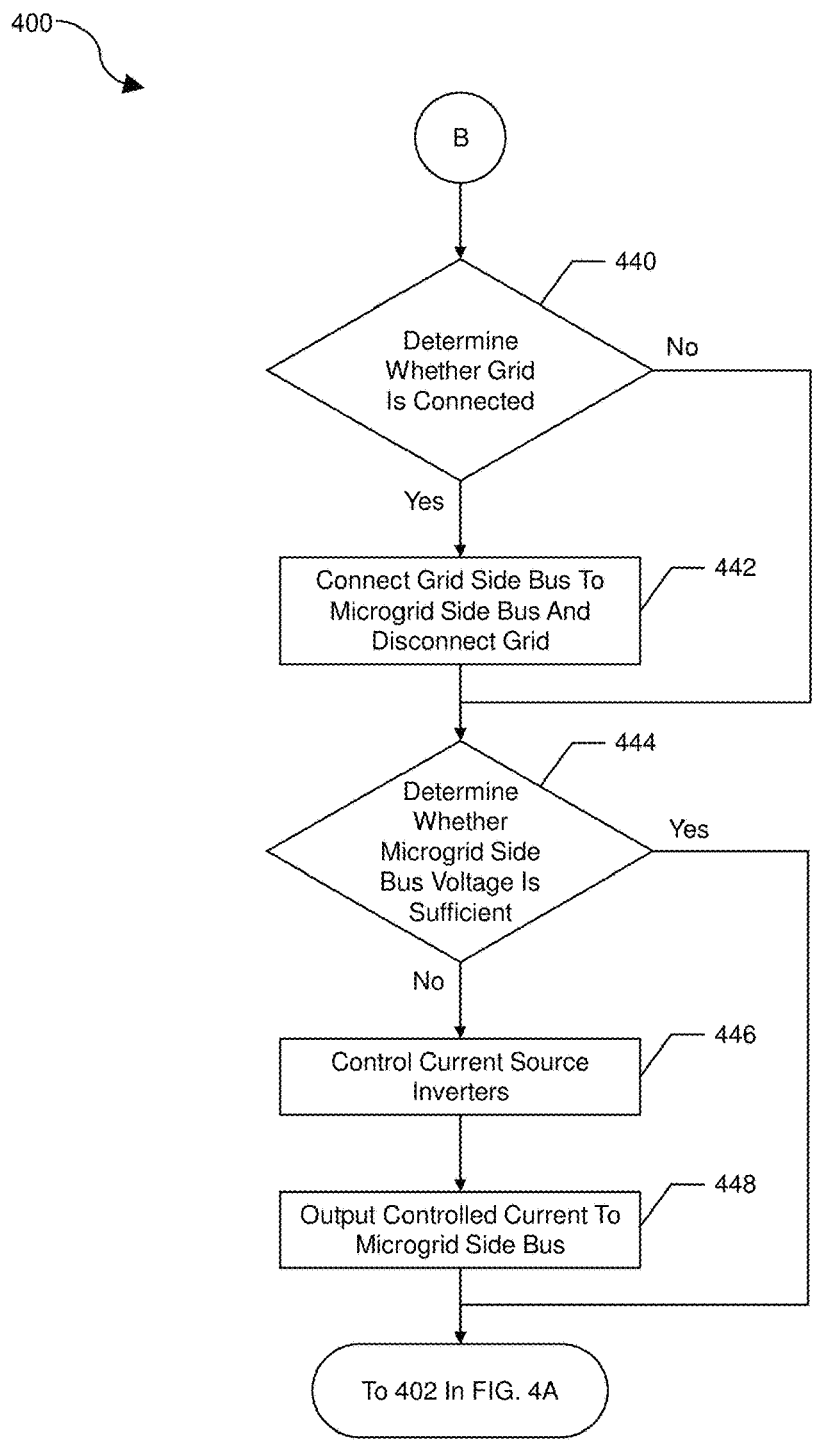

FIGS. 4A-4C are process flow diagrams of a method for fuel cell system based microgrid power management for the fuel cell system based microgrid 300 illustrated in FIG. 3 according to various embodiments. With reference to FIGS. 1-4C, the method 400 may be implemented using one or more controllers 320 configured to receive signals from any number or combination of the fuel cells 304a, 304b, the voltage source inverters 308a, 308b, the current source inverters 302a, 302b, 302c, the rectifier 310, the grid side bus 314, the microgrid side bus 318, the transmission buses 316a, 316b, 316c, 316d, 37a, 317b, the transfer switch 312, and/or the storage modules 306a, 306b, 306c. The method 400 may be implemented using the one or more controllers 320 configured to send control signals to any number and combination of the voltage source inverters 308a, 308b, the current source inverters 302a, 302b, 302c, the rectifier 310, the transfer switch 312, and/or the storage modules 306a, 306b, 306c. In order to encompass the alternative configurations enabled in various embodiments, the hardware implementing the method 400 is referred to herein as a "control device." Any number and combination of blocks 402-448 may be implemented periodically, repeatedly, or continuously, and/or concurrently with any other of blocks 402-448.

Referring to FIG. 4A, in block 402, the control device may measure a voltage at the microgrid side bus 318. When the grid side bus 314 is disconnected from the microgrid side bus 318 by the transfer switch 312, the voltage at the microgrid side bus 318 may be measured by receiving signals configured to indicate to the control device the voltage at the microgrid side bus 318 from, for example, any of the voltage source inverters 308a, 308b, the current source inverter 302c, and/or the transfer switch 312. The voltage at the microgrid side bus 318 may be measured by directly measuring the voltage at the microgrid side bus 318 by the control device at any of the voltage source inverters 308a, 308b, the current source inverter 302c, the microgrid side bus 318, the transmission buses 316a, 316b, 316c, 316d, and/or the transfer switch 312. When the grid side bus 314 is connected to the microgrid side bus 318 by the transfer switch 312, the voltage at the microgrid side bus 318 may be measured by receiving signals configured to indicate to the control device the voltage at the microgrid side bus 318 from, for additional example, any of the grid side bus 314 and/or the current source inverters 302a, 302b. The voltage at the microgrid side bus 318 may be measured by directly measuring the voltage at the microgrid side bus 318 by the control device additionally at any of the grid side bus 314 and/or the current source inverters 302a, 302b.

In block 404, the control device may control the voltage source inverters 308a, 308b. The control device may control the AC voltage output by the voltage source inverters 308a, 308b to the microgrid side bus 318. For example, the control device may signal to the voltage source inverters 308a, 308b or directly set the voltage source inverters 308a, 308b to a set point for the AC voltage output. The control device may control the voltage source inverters 308a, 308b to output the same amount of AC voltage to the microgrid side bus 318. The control device may control the voltage source inverters 308a, 308b to output AC voltage to the microgrid side bus 318 based on a load demand for a load for which the fuel cell system based microgrid 300 is deployed. The control device may additionally control the voltage source inverters 308a, 308b to limit the output AC voltage to the microgrid side bus 318 based on a lowest electric energy generation capacity from among the fuel cells 304a, 304b. For example, when an equal share of the load demand exceeds the lowest electric energy generation capacity from among the fuel cells 304a, 304b, the control device may limit the output AC voltage to the microgrid side bus 318 by the voltage source inverters 308a, 308b to the amount that may be output by the voltage source inverters 308a, 308b receiving DC voltage from the fuel cell 304a, 304b with the lowest electric energy generation capacity.

In block 406, the control device may control the voltage source inverters 308a, 308b to output a controlled amount of AC voltage to the microgrid side bus 318. The controlled amount of AC voltage may be based on the control the voltage source inverters 308a, 308b in block 404.

In block 408, the control device may measure a voltage at the grid side bus 314. The voltage at the grid side bus 314 may be measured by receiving signals configured to indicate to the control device the voltage at the grid side bus 314 from, for example, any of the current source inverters 302a, 302b, the transmission buses 317a, 317b, the rectifier 310, and/or the transfer switch 312. The voltage at the grid side bus 314 may be measured by directly measuring the voltage at the grid side bus 314 by the control device at any of the current source inverters 302a, 302b, the rectifier 310, the grid side bus 314, the transmission buses 317a, 317b, 316c, 316d, and/or the transfer switch 312.

In block 410, the control device may control the current source inverters 302a, 302b to output excess electric energy to the grid side bus 314. The current source inverters 302a, 302b may receive the DC current generated by the fuel cells 304a, 304b and not used by the voltage source inverters 308a, 308b to generate AC voltage for the microgrid side bus 318. The control device may control the AC current output by the current source inverters 302a, 302b to the microgrid side bus 318. For example, the control device may signal to the current source inverters 302a, 302b or directly set the current source inverters 302a, 302b to a set point for the AC current output. The control device may control the current source inverters 302a, 302b to output AC current to the grid side bus 314 based on a voltage at the grid side bus 314 and a volt-watt curve.

In determination block 412, the control device may determine whether the electric utility power grid is available. The control device may detect availability of the electric utility power grid, for example, by detecting a voltage and/or current level of the electric utility power grid. The control device may detect the voltage and/or the current level of the electric utility power grid by receiving signals configured to indicate to the control device the voltage and/or the current level of the electric utility power grid from, for example, any of the current source inverters 302a, 302b, the rectifier 310, and/or the transfer switch 312. The voltage and/or the current level of the electric utility power grid may be measured by directly measuring the voltage and/or the current level of the electric utility power grid by the control device at any of the current source inverters 302a, 302b, the rectifier 310, the grid side bus 314, the transmission buses 317a, 317b, 316c, 316d, and/or the transfer switch 312. The control device may determine whether the electric utility power grid is available by comparing the voltage and/or the current level of the electric utility power grid to a grid availability threshold. In response to determining that the electric utility power grid is available (i.e., determination block 412="Yes"), the control device may continue to operate in the normal operating mode in steps "A" described below with respect to FIG. 4B. In response to determining that the electric utility power grid is not available (i.e., determination block 412="No"), the control device may operate in the emergency mode in steps "B" described below with respect to FIG. 4C.

Referring to FIG. 4B, in response to determining that the electric utility power grid is available (i.e., determination block 412="Yes"), the control device may determine whether the fuel cell system based microgrid 300 is connected to the electric utility power grid in determination block 420. The control device may determine the connection status to the fuel cell system based microgrid 300 to the electric utility power grid based on a state, position, etc. of the transfer switch 312. When the transfer switch 312 selectively electrically connects the grid side bus 314 to the electric utility power grid, the fuel cell system based microgrid 300 may be connected to the electric utility power grid in the normal operating mode. When the transfer switch 312 selectively electrically connects the grid side bus 314 to the microgrid side bus 318, the fuel cell system based microgrid 300 may be disconnected from the electric utility power grid in the emergency operating mode.

In response to determining that the fuel cell system based microgrid 300 is not connected to the electric utility power grid (i.e., determination block 420="No"), the control device may electrically disconnect the grid side bus 314 from the microgrid side bus 318 and electrically connect the grid side bus 314 to the electric utility power grid in block 422. The control device may control the transfer switch 312 to change states or positions to electrically disconnect the grid side bus 314 from the microgrid side bus 318 and electrically connect the grid side bus 314 to the electric utility power grid.

In response to determining that the fuel cell system based microgrid 300 is connected to the electric utility power grid (i.e., determination block 420="Yes") or following block 422, the control device may determine whether the voltage at the microgrid side bus 318 is sufficient to support the load in determination block 424. The control device may measure the voltage at the microgrid side bus 318, for example, as described herein with reference to block 402 or using the measurement of the voltage at the microgrid side bus 318 of block 402. The control device may compare the measurement of the voltage at the microgrid side bus 318 to the load demand. The voltage at the microgrid side bus 318 may be insufficient when the voltage at the microgrid side bus 318 falls short of the load demand, and sufficient when the voltage at the microgrid side bus 318 meets or exceeds the load demand.

In response to determining that the voltage at the microgrid side bus 318 is not sufficient to support the load (i.e., determination block 424="No"), the control device may control the rectifier 310 and current source inverter 302c in block 426. The control device may control the control rectifier 310 and current source inverter 302c to provide electric energy from the grid side bus 314 to the microgrid side bus 318. The electric energy from the grid side bus 314 may include AC current output to the grid side bus 318 by the current source inverter 302a, 302b as described herein with reference to block 410. The control device may control the rectifier 310 and the current source inverter 302c, for example, by signaling to control the rectifier 310 and the current source inverter 302c or directly setting at the rectifier 310 and the current source inverter 302c set points for current output. The set points for current output may be based on an amount of current needed, in addition to the voltage at the microgrid side bus 318, to satisfy the load demand based on a volt-watt curve.

In block 428, the control device may control the rectifier 310 to draw AC current from the grid side bus 314. The control device may control the rectifier 310 to draw an amount of AC current from the grid side bus 314 and output DC current based on the control of the rectifier 310 in block 426. In block 430, the control device may control the current source inverter 302c to output a controlled amount of AC current to the microgrid side bus 318. The control device may control the current source inverter 302c to convert an amount of the DC current and output the controlled amount of AC current to the microgrid side bus 318 based on the control of the current source inverter 302c in block 426.

In response to determining that the voltage at the microgrid side bus 318 is sufficient to support the load (i.e., determination block 424="Yes") or following block 430, the control device may control export of excess electric energy at the grid side bus 314 to the electric utility power grid in block 432. The control device may continue to measure the voltage at the microgrid side bus 318 in block 402.

Referring to FIG. 4C, in response to determining that the electric utility power grid is not available (i.e., determination block 412="No"), the control device may determine whether the fuel cell system based microgrid 300 is connected to the electric utility power grid in determination block 440. The control device may determine the connection status to the fuel cell system based microgrid 300 to the electric utility power grid based on a state, position, etc. of the transfer switch 312. When the transfer switch 312 selectively electrically connects the grid side bus 314 to the electric utility power grid, the fuel cell system based microgrid 300 may be connected to the electric utility power grid. When the transfer switch 312 selectively electrically connects the grid side bus 314 to the microgrid side bus 318, the fuel cell system based microgrid 300 may be disconnected from the electric utility power grid.

In response to determining that the fuel cell system based microgrid 300 is connected to the electric utility power grid (i.e., determination block 440="Yes"), the control device may electrically connect the grid side bus 314 to the microgrid side bus 318 and electrically disconnect the grid side bus 314 from the electric utility power grid in block 442. The control device may control the transfer switch 312 to change states or positions to electrically connect the grid side bus 314 to the microgrid side bus 318 and electrically disconnect the grid side bus 314 from the electric utility power grid.

In response to determining that the fuel cell system based microgrid 300 is not connected to the electric utility power grid (i.e., determination block 440="No") or following block 442, the control device may determine whether the voltage at the microgrid side bus 318 is sufficient to support the load in determination block 444. The control device may measure the voltage at the microgrid side bus 318, for example, as described herein with reference to block 402 or using the measurement of the voltage at the microgrid side bus 318 of block 402. The control device may compare the measurement of the voltage at the microgrid side bus 318 to the load demand. The voltage at the microgrid side bus 318 may be insufficient when the voltage at the microgrid side bus 318 falls short of the load demand, and sufficient when the voltage at the microgrid side bus 318 meets or exceeds the load demand.

In response to determining that the voltage at the microgrid side bus 318 is not sufficient to support the load (i.e., determination block 444="No"), the control device may control the current source inverters 302a, 302b in block 446. The control device may control the control the current source inverters 302a, 302b to provide electric energy from the fuel cells 304a, 304b to the microgrid side bus 318 via the grid side bus 314 and the transmission bus 316d. The electric energy may include AC current output to the grid side bus 318 by the current source inverters 302a, 302b as described herein with reference to block 410. The control device may control the current source inverters 302a, 302b, for example, by signaling to control the current source inverters 302a, 302b or directly setting the current source inverters 302a, 302b to set points for current output. The set points for current output may be based on an amount of current needed, in addition to the voltage at the microgrid side bus 318, to satisfy the load demand based on a volt-watt curve.

In block 448, the control device may control the current source inverters 302a, 302b to output a controlled amount of AC current to the microgrid side bus 318 via the grid side bus 314. The control device may control the current source inverters 302a, 302b to convert an amount of the DC current and output the controlled amount of AC current to the microgrid side bus 318 via the grid side bus 314 based on the control of the current source inverters 302a, 302b in block 446.

In response to determining that the voltage at the microgrid side bus 318 is sufficient to support the load (i.e., determination block 444="Yes") or following block 448, the control device may continue to measure the voltage at the microgrid side bus 318 in block 402.

Figure 5:
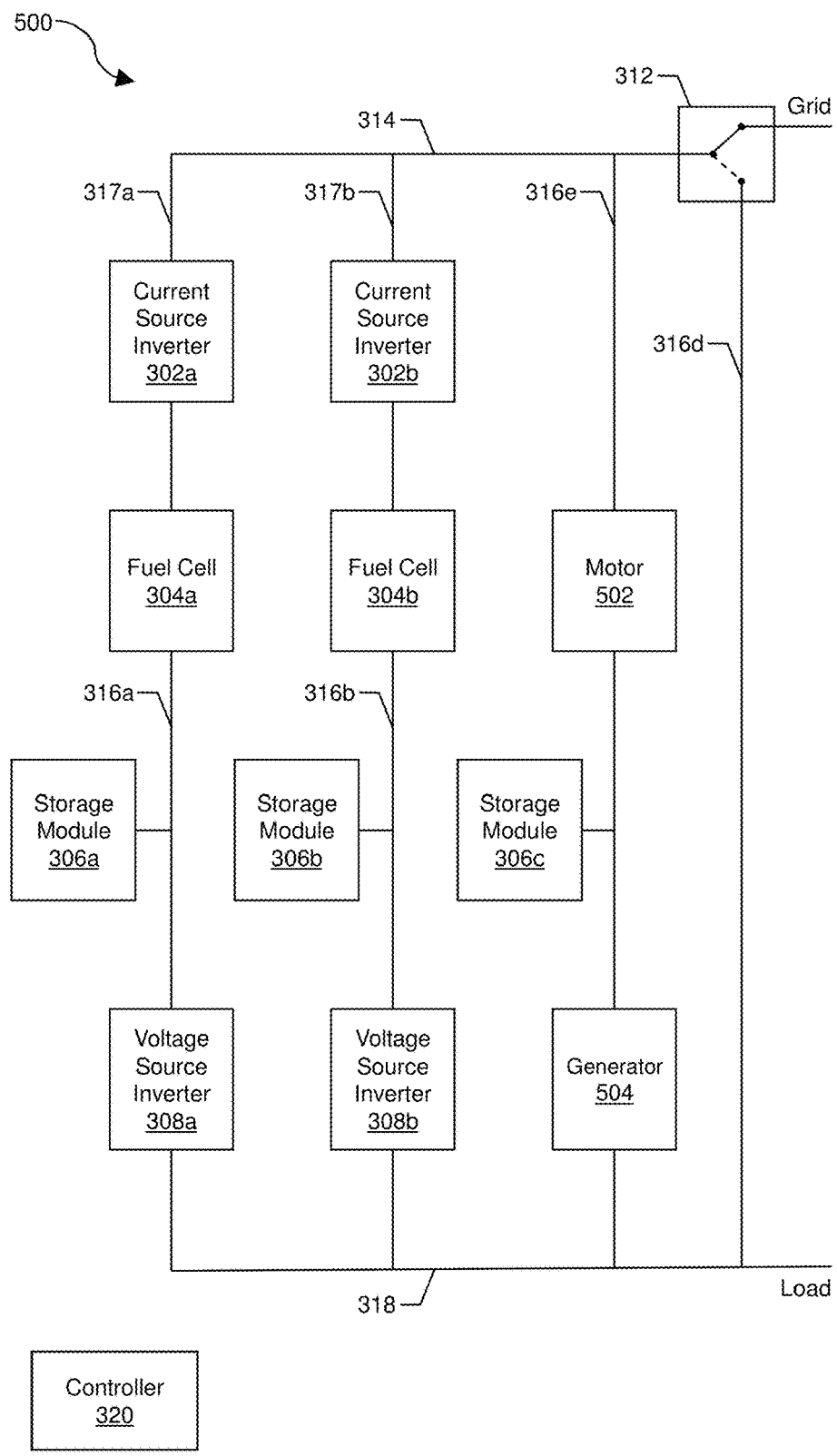
FIG. 5 is a component block diagram of a fuel cell system based microgrid suitable for implementing various embodiments.

FIG. 5 illustrates a fuel cell system based microgrid 500 suitable for implementing various embodiments. With reference to FIGS. 1-5, the fuel cell system based microgrid 500 may include the multiple fuel cells 304a, 304b, voltage source inverters 308a, 308b, current source inverters 302a, 302b, a grid side bus 314, a microgrid side bus 318, transmission buses 316a, 316b, 316d, 317a, 317b and a transfer switch 312. In some examples, the fuel cell system based microgrid 500 may also include storage modules 306a, 306b, 306c. The fuel cells 304a, 304b, the voltage source inverters 308a, 308b, the current source inverters 302a, 302b, the grid side bus 314, the microgrid side bus 318, the transmission buses 316a, 316b, 316d, 317a, 317b, the transfer switch 312, and/or the storage modules 306a, 306b, 306c may be configured, structured, electrically connected, and/or function as described herein with reference to FIGS. 3-4C unless otherwise stated. The fuel cell system based microgrid 500 may also include a motor 502, a generator 504, and a transmission bus 316e instead of the respective rectifier 310, current source inverter 302c and the transmission bus 316c shown in FIG. 3.

The motor 502 may be configured to draw AC current from the grid side bus 314 via the transmission bus 316e in response to a need for more electric energy to support the load demand when the transfer switch 312 selectively electrically connects the grid side bus 314 to the electric utility power grid in the normal operating mode. The AC voltage output to the microgrid side bus 318 by the voltage source inverters 308a, 308b may be insufficient to support the load demand. To increase the amount of AC voltage provided to the microgrid side bus 318, the motor 502 may draw AC current from the grid side bus 314. The motor 502 may use the received AC current to drive the motor 502. The motor 502 may operate at various speeds to drive the generator 504. Any remaining AC current at the grid side bus 314 may be exported to the electric utility power grid. In response to the load demand being satisfied by the voltage source inverters 308a, 308b, the motor 502 may be configured to not draw AC current from the grid side bus 314, and the AC current at the grid side bus 314 may be exported to the electric utility power grid. The amount of AC current drawn by the motor 502 from the grid side bus 314 and the speed at which to operate and/or drive the generator 504 may be controlled by a controller 320.

The motor 502 may drive the generator 504 using the AC current drawn from the grid side bus 314, and the generator 504 may generate AC electric energy and provide the AC electric energy to the microgrid side bus 318 via the transmission bus 316e. The AC electric energy may be configured as an amount of AC current configured to follow a volt-watt curve. The amount of AC current output by the generator 504 to the microgrid side bus 318 may be controlled based on the load demand. For example, the generator 504 may output AC current following a volt-watt curve based on a voltage at the microgrid side bus 318 and/or the voltage source inverters 308a, 308b, and the load demand. The AC current output by the generator 504 may be an amount sufficient to supplement the shortfall of the output of AC voltage of the voltage source inverters 308a, 308b to support the load demand. The amount of AC current output by the generator 504 may be controlled by a controller 320.

The storage module 306c may be electrically connected in parallel to the motor 502 and the generator 504. The storage module 306c may be electrically connected to microgrid side bus 318 by the transmission bus 316e.

In this embodiment, a large amount of the short-circuit current may be available from the generator 504. Microgrid systems generally source far less short circuit current than grid-tied systems due to the inverter technology. Thus, the generator 504 advantageously acts to source a large amount of short circuit current in the event of a fault, quickly clearing the protective device.

Figure 6A:
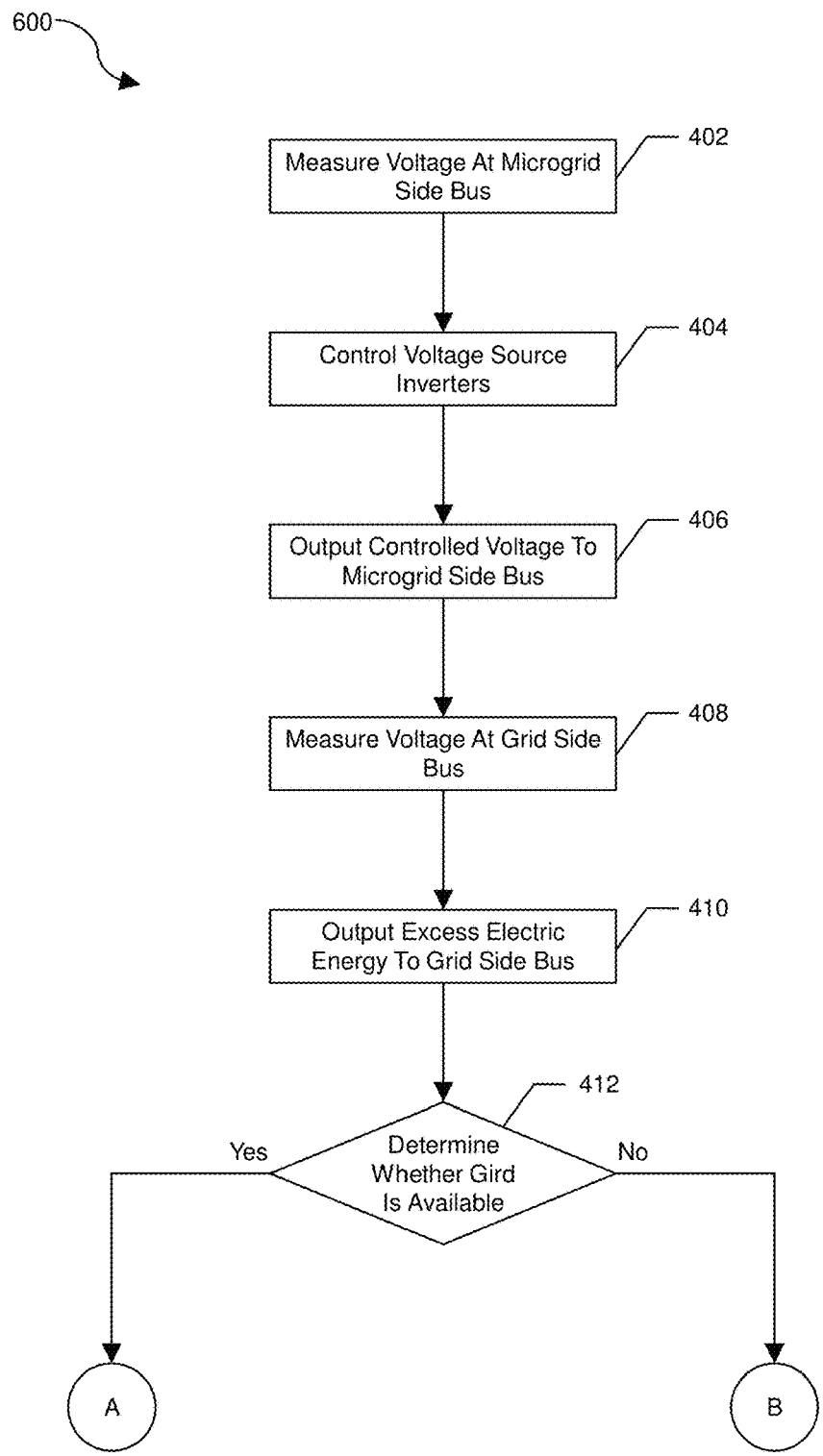
FIGS. 6A-6C are process flow diagrams of a method of power management for the fuel cell system based microgrid illustrated in FIG. 5 according to various embodiments.
Figure 6B:
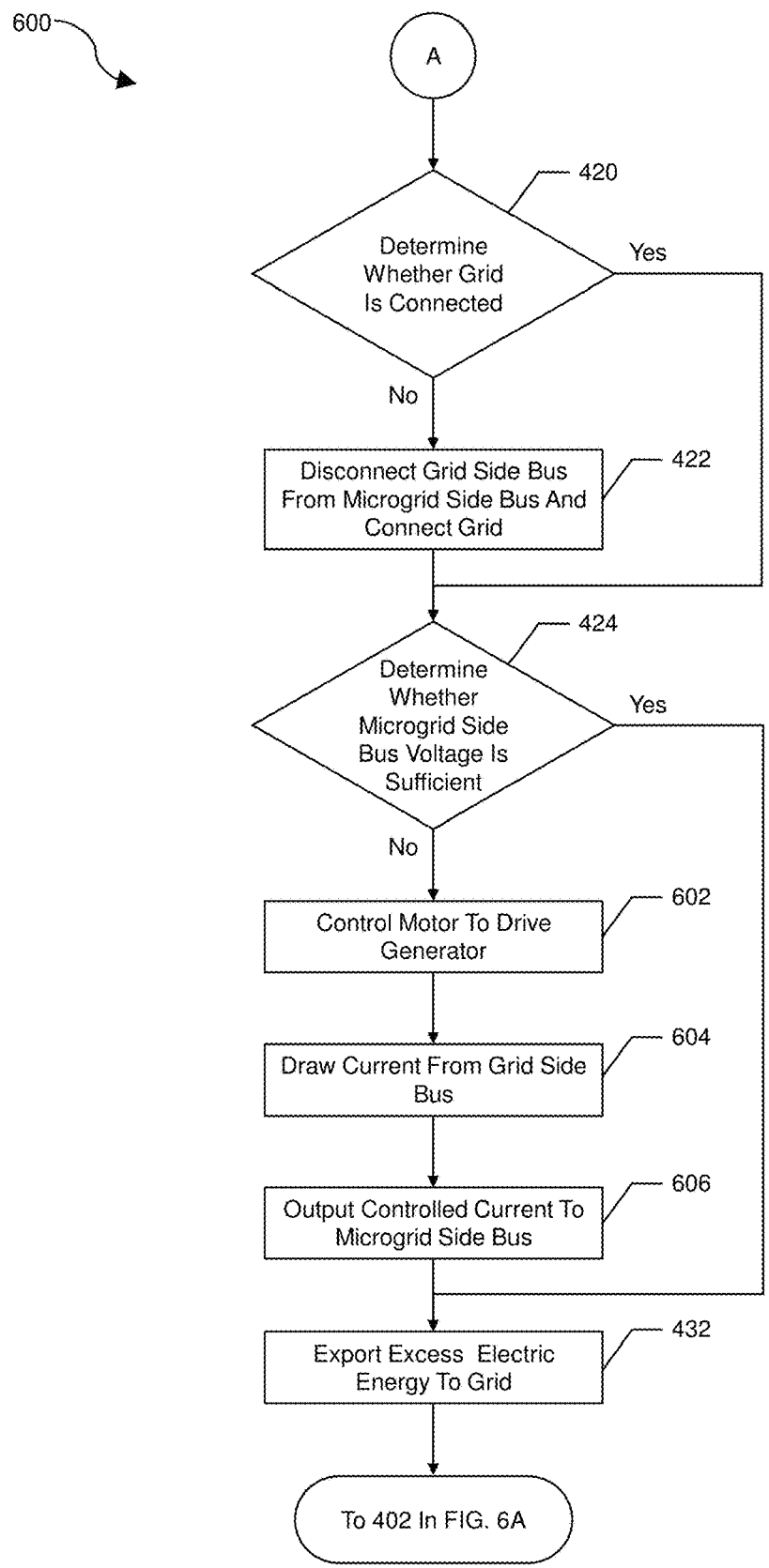
Figure 6C:
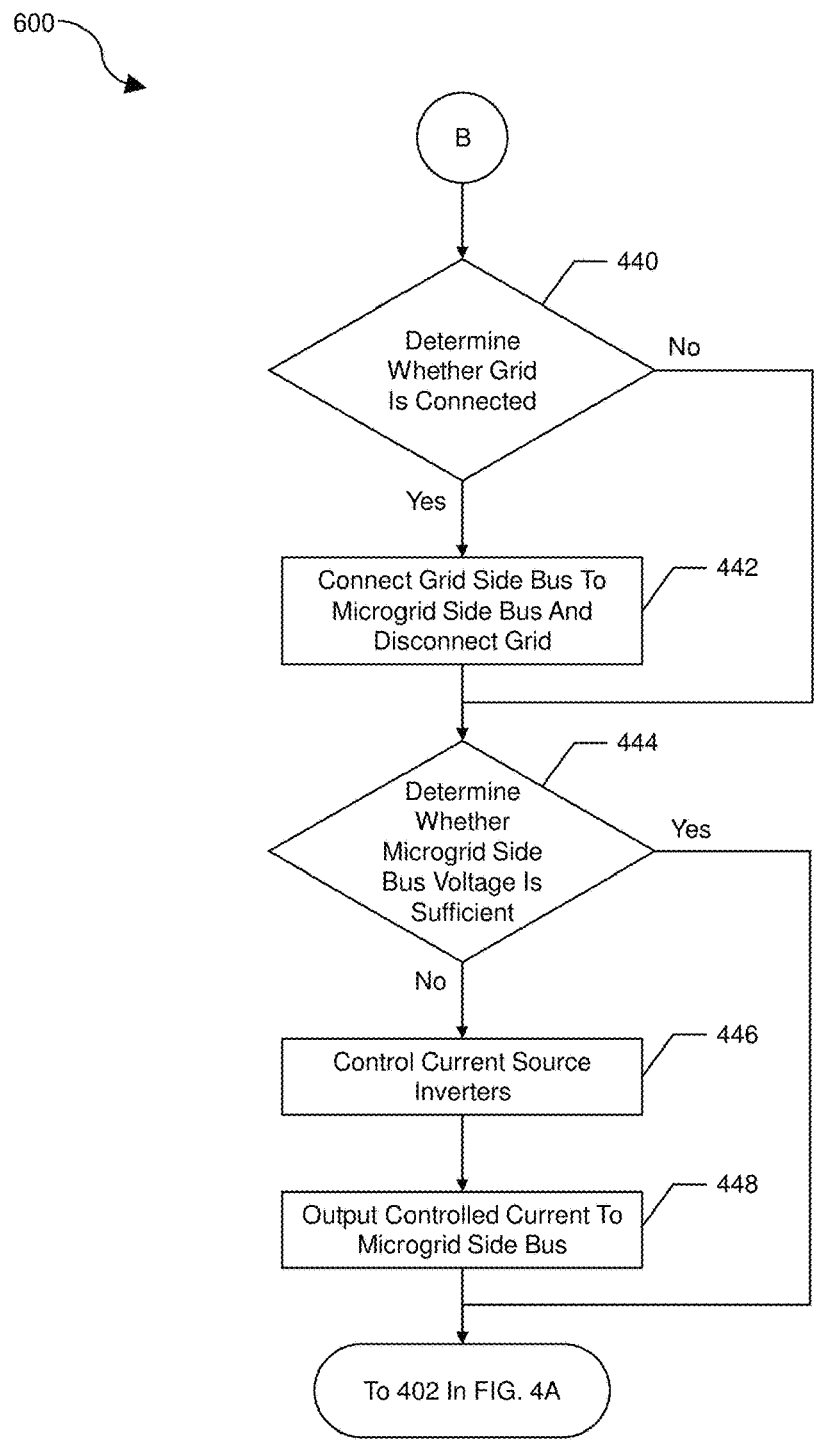

FIGS. 6A-6C are process flow diagrams of a method for fuel cell system based microgrid power management for the fuel cell system based microgrid 500 illustrated in FIG. 5 according to various embodiments. With reference to FIGS. 1-6C, the method 600 may be implemented using one or more controllers 320 configured to receive signals from any number or combination of the fuel cells 304a, 304b, the voltage source inverters 308a, 308b, the current source inverters 302a, 302b, the motor 502, the generator 504, the grid side bus 314, the microgrid side bus 318, the transmission buses 316a, 316b, 316d, 316e, 317a, 317b, the transfer switch 312, and/or the storage modules 306a, 306b, 306c. The method 600 may be implemented using the one or more controllers 320 configured to send control signals to any number and combination of the voltage source inverters 308a, 308b, the current source inverters 302a, 302b, the motor 502, the generator 504, the transfer switch 312, and/or the storage modules 306a, 306b, 306c. In order to encompass the alternative configurations enabled in various embodiments, the hardware implementing the method 600 is referred to herein as a "control device." Any number and combination of blocks 402-448 and 602-606 may be implemented periodically, repeatedly, or continuously, and/or concurrently with any other of blocks 402-448 and 602-606. The blocks 402-448 may describe portions of the method 600 in a manner similar to the blocks 402-448 as described herein for the method 400 with reference to FIGS. 4A-4C.

Referring to FIG. 6A, in block 402, the control device may measure a voltage at the microgrid side bus 318. In block 404, the control device may control the voltage source inverters 308a, 308b. In block 406, the control device may control the voltage source inverters 308a, 308b to output a controlled amount of AC voltage to the microgrid side bus 318. In block 408, the control device may measure a voltage at the grid side bus 314. In block 410, the control device may control the current source inverters 302a, 302b to output excess electric energy to the grid side bus 314. In determination block 412, the control device may determine whether the electric utility power grid is available. In response to determining that the electric utility power grid is available (i.e., determination block 412="Yes"), the control device may continue to steps "A" in FIG. 6B. In response to determining that the electric utility power grid is not available (i.e., determination block 412="No"), the control device may continue to steps "B" in FIG. 6C.

Referring to FIG. 6B, in response to determining that the electric utility power grid is available (i.e., determination block 412="Yes"), the control device may determine whether the fuel cell system based microgrid 500 is connected to the electric utility power grid in determination block 420. In response to determining that the fuel cell system based microgrid 500 is not connected to the electric utility power grid (i.e., determination block 420="No"), the control device may electrically disconnect the grid side bus 314 from the microgrid side bus 318 and electrically connect the grid side bus 314 to the electric utility power grid in block 422. In response to determining that the fuel cell system based microgrid 500 is connected to the electric utility power grid (i.e., determination block 420="Yes") or following block 422, the control device may determine whether the voltage at the microgrid side bus 318 is sufficient to support the load in determination block 424.

In response to determining that the voltage at the microgrid side bus 318 is not sufficient to support the load (i.e., determination block 424="No"), the control device may control the motor 502 to drive the generator 504 in block 602. The control device may control the control the motor 502 and the generator 504 to provide electric energy from the grid side bus 314 to the microgrid side bus 318. The electric energy from the grid side bus 314 may include AC current output to the grid side bus 318 by the current source inverter 302a, 302b as described above with reference to block 410. The control device may control the motor 502 and the generator 504, for example, by signaling to control the motor 502 and the generator 504 or directly setting the motor 502 and the generator 504 to set points for operating speed and/or current output. The set points for operating speed and/or current output may be based on an amount of current needed, in addition to the voltage at the microgrid side bus 318, to satisfy the load demand based on a volt-watt curve.

In block 604, the control device may control the motor 502 to draw AC current from the grid side bus 314. The control device may control the motor 502 to draw an amount of AC current from the grid side bus 314 to operate at a certain speed based on the control of the motor 502 in block 602. In block 606, the control device may control the generator 504 to output a controlled amount of AC current to the microgrid side bus 318. The control device may control the generator 504 to operate at a certain speed and output the controlled amount of AC current to the microgrid side bus 318 based on the control of the generator in block 602.

In response to determining that the voltage at the microgrid side bus 318 is sufficient to support the load (i.e., determination block 424="Yes") or following block 430, the control device may control export of excess electric energy at the grid side bus 314 to the electric utility power grid in block 432. The control device may continue to measure the voltage at the microgrid side bus 318 in block 402.

Referring to FIG. 6C, in response to determining that the electric utility power grid is not available (i.e., determination block 412="No"), the control device may determine whether the fuel cell system based microgrid 500 is connected to the electric utility power grid in determination block 440. In response to determining that the fuel cell system based microgrid 500 is connected to the electric utility power grid (i.e., determination block 440="Yes"), the control device may electrically connect the grid side bus 314 to the microgrid side bus 318 and electrically disconnect the grid side bus 314 from the electric utility power grid in block 442. In response to determining that the fuel cell system based microgrid 500 is not connected to the electric utility power grid (i.e., determination block 440="No") or following block 442, the control device may determine whether the voltage at the microgrid side bus 318 is sufficient to support the load in determination block 444. In response to determining that the voltage at the microgrid side bus 318 is not sufficient to support the load (i.e., determination block 444="No"), the control device may control the current source inverters 302a, 302b in block 446. In block 448, the control device may control the current source inverters 302a, 302b to output a controlled amount of AC current to the microgrid side bus 318 via the grid side bus 314. In response to determining that the voltage at the microgrid side bus 318 is sufficient to support the load (i.e., determination block 444="Yes") or following block 448, the control device may continue to measure the voltage at the microgrid side bus 318 in block 402.

Figure 7:
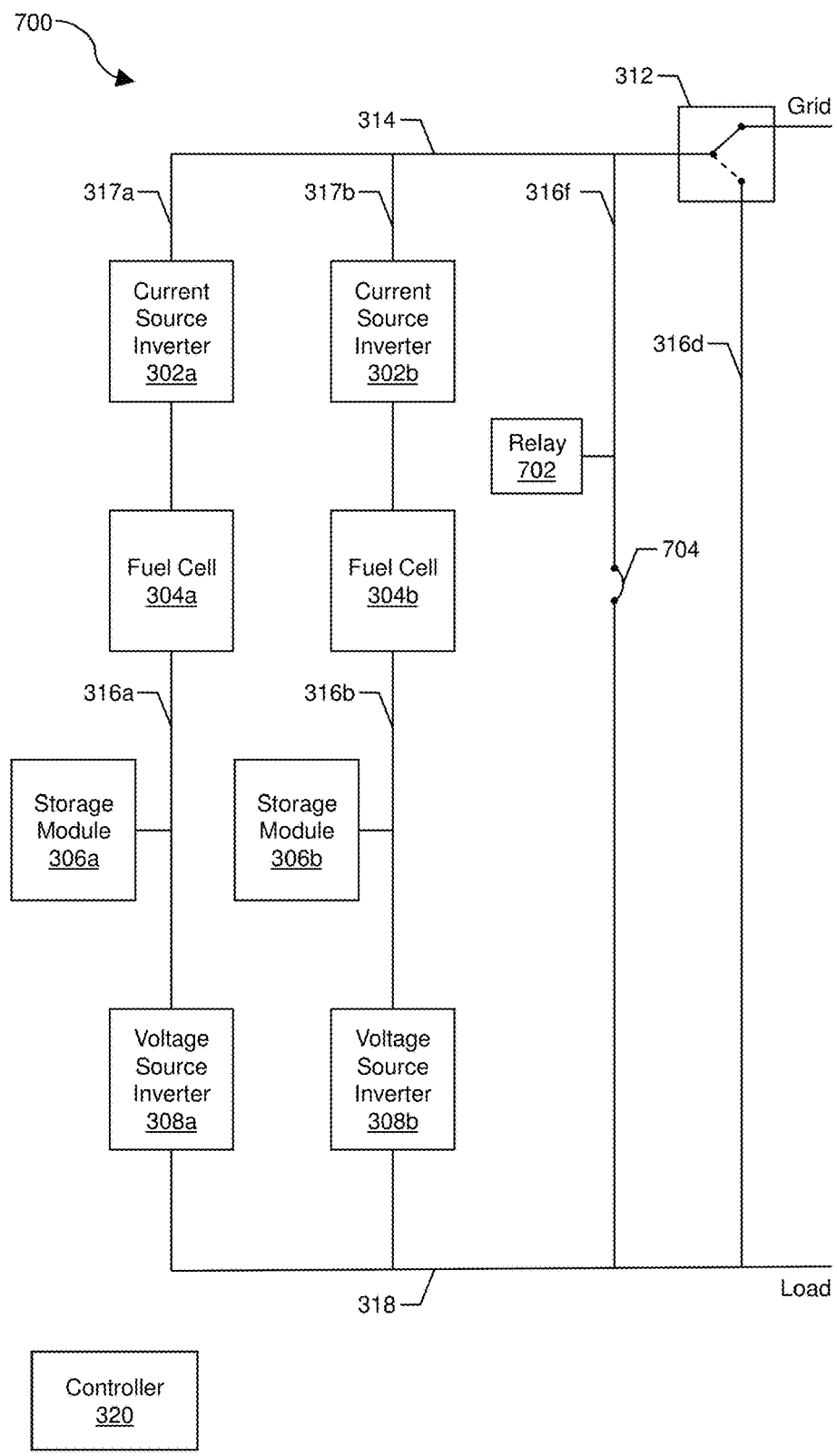
FIG. 7 is a component block diagram of a fuel cell system based microgrid suitable for implementing various embodiments.

FIG. 7 illustrates a fuel cell system based microgrid 700 suitable for implementing various embodiments. With reference to FIGS. 1-7, the fuel cell system based microgrid 700 may include the multiple fuel cells 304a, 304b, voltage source inverters 308a, 308b, current source inverters 302a, 302b, a grid side bus 314, a microgrid side bus 318, transmission buses 316a, 316b, 316d, 317a, 317b, and a transfer switch 312. In some examples, the fuel cell system based microgrid 700 may also include storage modules 306a, 306b, 306c. The fuel cells 304a, 304b, the voltage source inverters 308a, 308b, the current source inverters 302a, 302b, the grid side bus 314, the microgrid side bus 318, the transmission buses 316a, 316b, 316d, 317a, 317b, the transfer switch 312, and/or the storage modules 306a, 306b, 306c may be configured, structured, electrically connected, and/or function as described herein with reference to FIGS. 3-6C unless otherwise stated. The fuel cell system based microgrid 700 may also include a relay 702, an electric contactor 704, and a transmission bus 316f instead of the motor 502, the generator 504, and the transmission bus 316e shown in FIG. 5.

The current source inverters 302a, 302b may be configured to provide the AC current to the grid side bus 314 following a volt-watt curve. The amount of AC current output by the current source inverters 302a, 302b to the grid side bus 314 may be controlled based on various electrical connections of the grid side bus 314. For example, the grid side bus 314 may be selectively electrically connected to an electric utility power grid (i.e., "grid" in FIG. 7) by the transfer switch 312 in the normal operating mode. The current source inverters 302a, 302b may output AC current following a volt-watt curve based on a voltage at the grid side bus 314, the microgrid side bus 318, the current source inverters 302a, 302b, the voltage source inverters 308a, 308b, the relay 702, the electric contactor 704, the transmission bus 316f, and/or the transfer switch 312. The AC current on the grid side bus 314 may be exported to the electric utility power grid and/or used to support the load by flowing to the microgrid side bus 318. In another example, the grid side bus 314 may be selectively electrically connected to the microgrid side bus 318 by the transfer switch 312 and the transmission bus 316d in the emergency operating mode. The current source inverters 302a, 302b may output AC current following a volt-watt curve based on a voltage at the grid side bus 314, the current source inverters 302a, 302b, the transfer switch 312, the transmission bus 316d, the microgrid side bus 318, and/or the voltage source inverters 308a, 308b. The amount of AC current output by the current source inverters 302a, 302b may be controlled by a controller 320.

The relay 702 may be configured to detect current flow between the grid side bus 314 and the microgrid side bus 318 at the transmission bus 316f. When the AC current at the grid side bus 314 supports the load, AC current flows from the grid side bus 314 to the microgrid side bus 314 in a "forward flow". However, there are instances in which AC current may flow from the microgrid side bus 314 to the grid side bus 314 in a "reverse flow". The electric contactor 704 may be electronically controlled to allow or interrupt current flow on the transmission bus 316f. The electric contactor 704 may be any form of electronically controlled contactor, such as a circuit breaker, switch, etc.

In response to detecting the reverse flow on the transmission bus 316f, the relay 702 may signal to the electric contactor 704 to interrupt the reverse flow on the transmission bus 316f. In some examples, the relay 702 may signal directly to the electric contactor 704 to interrupt the reverse flow on the transmission bus 316f. In some examples, the relay 702 may signal to the electric contactor 704 to interrupt the reverse flow on the transmission bus 316f via the controller 320, by signaling detection of the reverse flow on the transmission bus 316f to the controller 320, and the controller 320 signaling to the electric contactor 704 to interrupt the reverse flow on the transmission bus 316f.

The transfer switch 312 and the electric contactor 704 positions or states may be interlocked. For example, when the transfer switch 312 selectively electrically connects the grid side bus 314 to the electric utility power grid, in the normal operating mode, the electric contactor 704 may maintain an electrical connection between the grid side bus 314 and the microgrid side bus 318 on the transmission bus 316f, and vice vera. In another example, when the transfer switch 312 selectively electrically connects the grid side bus 314 to the microgrid side bus 318 in the emergency operating mode, the electric contactor 704 may interrupt an electrical connection between the grid side bus 314 and the microgrid side bus 318 on the transmission bus 316f, and vice vera.

Figure 8A:
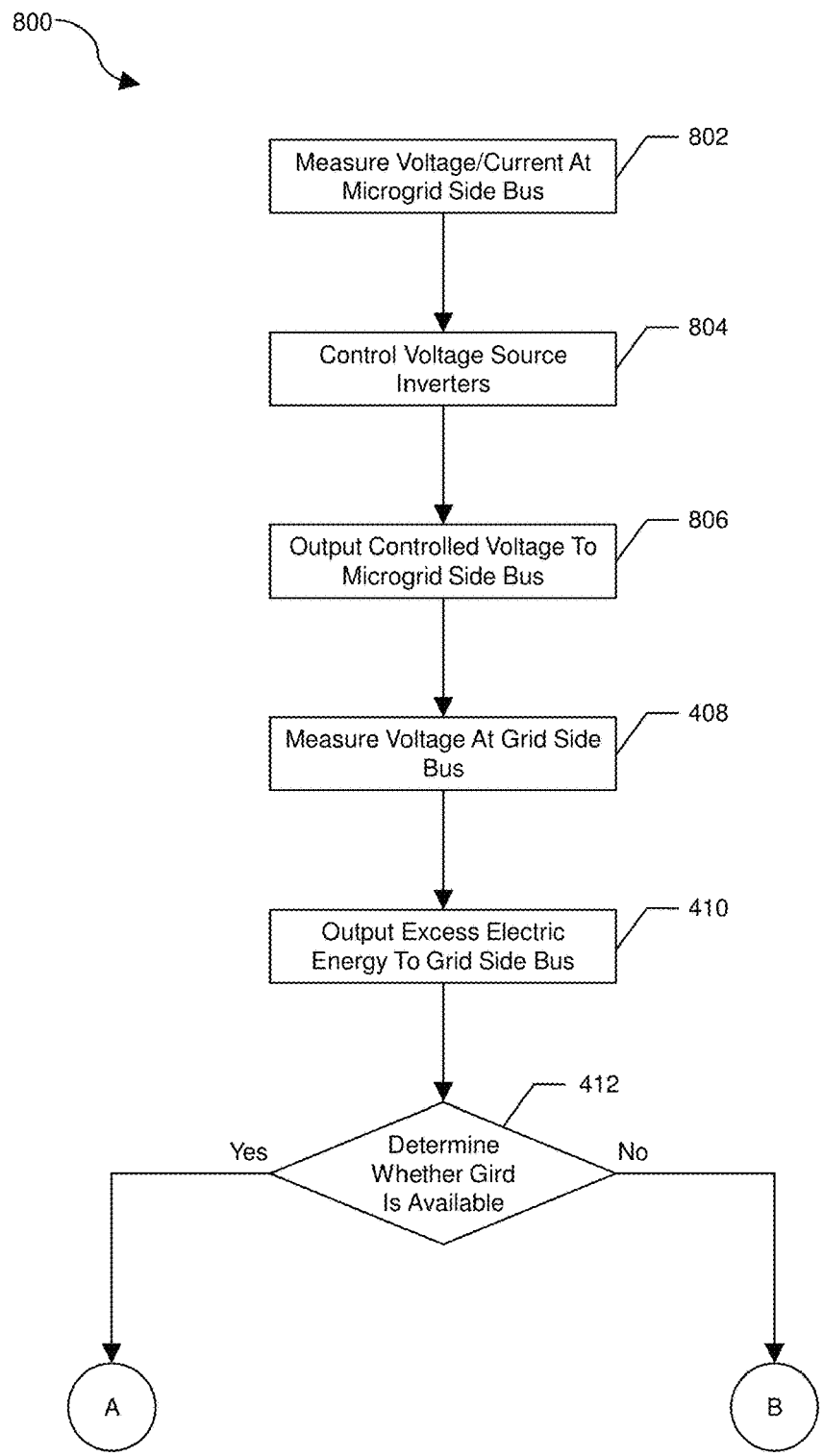
FIGS. 8A-8C are process flow diagrams of a method of power management for the fuel cell system based microgrid illustrated in FIG. 7 according to various embodiments.
Figure 8B:
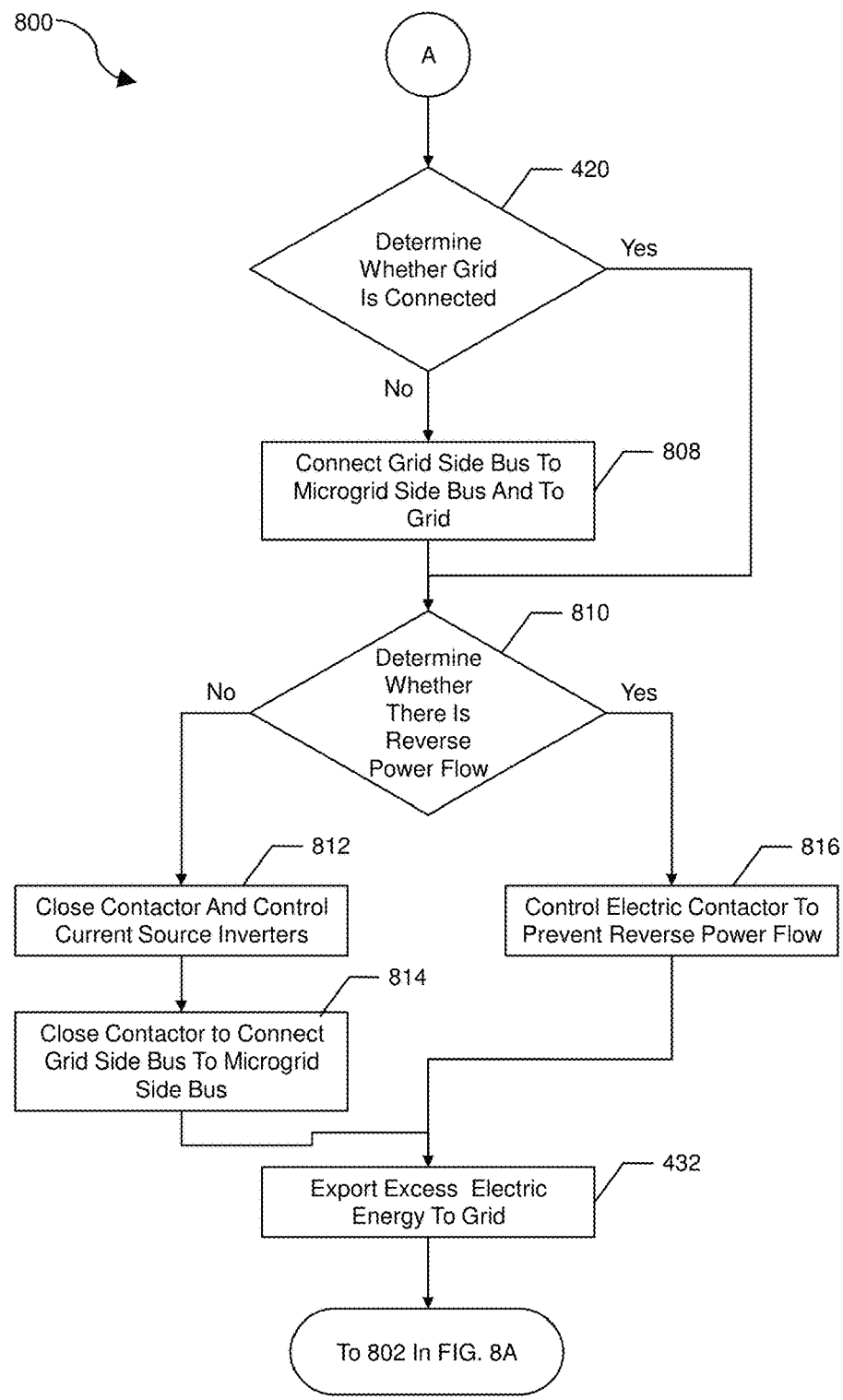
Figure 8C:
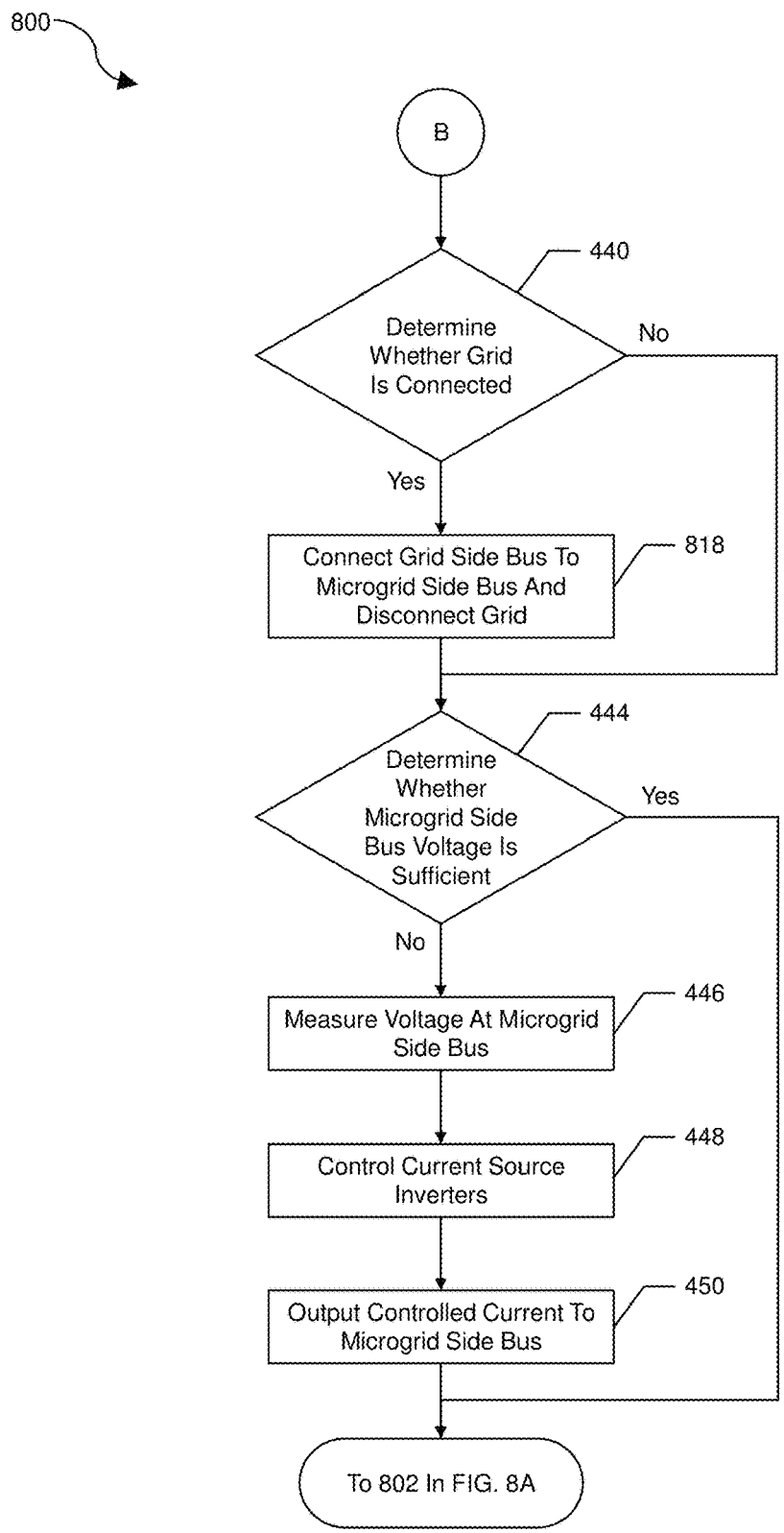

FIGS. 8A-8C are process flow diagrams of a method for fuel cell system based microgrid power management for the fuel cell system based microgrid 700 illustrated in FIG. 7 according to various embodiments. With reference to FIGS. 1-8C, the method 800 may be implemented using one or more controllers 320 configured to receive signals from any number or combination of the fuel cells 304a, 304b, the voltage source inverters 308a, 308b, the current source inverters 302a, 302b, the relay 702, the electric contactor 704, the grid side bus 314, the microgrid side bus 318, the transmission buses 316a, 316b, 316d, 316f, 317a, 317b, the transfer switch 312, and/or the storage modules 306a, 306b. The method 800 may be implemented using the one or more controllers 320 and/or the relay 704 configured to send control signals to any number and combination of the voltage source inverters 308a, 308b, the current source inverters 302a, 302b, the electrical contactor 704, the transfer switch 312, and/or the storage modules 306a, 306b. In order to encompass the alternative configurations enabled in various embodiments, the hardware implementing the method 800 is referred to herein as a "control device." Any number and combination of blocks 402-448 and 802-808 may be implemented periodically, repeatedly, or continuously, and/or concurrently with any other of blocks 402-448 and 802-808. The blocks 402-448 may describe portions of the method 800 in a manner similar to the blocks 402-448 as described herein for the method 400 with reference to FIGS. 4A-4C.

Referring to FIG. 8A, in block 802, the control device may measure a voltage and/or a current at the microgrid side bus 318. When the grid side bus 314 is connected to the microgrid side bus 318 by the electric contactor 704, the voltage and/or current at the microgrid side bus 318 may be measured by receiving signals configured to indicate to the control device the voltage and/or current at the microgrid side bus 318 from, for example, any of the voltage source inverters 308a, 308b, the relay 702, the electric contactor 704, and/or the transfer switch 312. The voltage and/or current at the microgrid side bus 318 may be measured by directly measuring the voltage and/or current at the microgrid side bus 318 by the control device at any of the voltage source inverters 308a, 308b, the relay 702, the electric contactor 704, the microgrid side bus 318, the transmission buses 316a, 316b, 316d, 316f, and/or the transfer switch 312. When the grid side bus 314 is connected to the microgrid side bus 318 by the transfer switch 312, the voltage and/or current at the microgrid side bus 318 may be measured by receiving signals configured to indicate to the control device the voltage and/or current at the microgrid side bus 318 from, for additional example, any of the grid side bus 314 and/or the current source inverters 302a, 302b. The voltage and/or current at the microgrid side bus 318 may be measured by directly measuring the voltage at the microgrid side bus 318 by the control device additionally at any of the grid side bus 314 and/or the current source inverters 302a, 302b.

In block 804, the control device may control the voltage source inverters 308a, 308b. The control device may control the AC voltage output by the voltage source inverters 308a, 308b to the microgrid side bus 318. For example, the control device may signal to the voltage source inverters 308a, 308b or directly set at the voltage source inverters 308a, 308b a set point for the AC voltage output. The control device may control the voltage source inverters 308a, 308b to output the same amount of AC voltage to the microgrid side bus 318. The control device may control the voltage source inverters 308a, 308b to output AC voltage to the microgrid side bus 318 based on a load demand for a load for which the fuel cell system based microgrid 700 is deployed. The control device may control the voltage source inverters 308*a*, 308*b* to output AC voltage to the microgrid side bus 318 to prevent export of the current on the microgrid side bus 318 to the electric utility power grid. The control device may additionally control the voltage source inverters 308*a*, 308*b* to limit the output AC voltage to the microgrid side bus 318 based on a lowest electric energy generation capacity from among the fuel cells 304*a*, 304*b*. For example, when an equal share of the load demand exceeds the lowest electric energy generation capacity from among the fuel cells 304*a*, 304*b*, the control device may limit the output AC voltage to the microgrid side bus 318 by the voltage source inverters 308*a*, 308*b* to the amount that may be output by the voltage source inverters 308*a*, 308*b* receiving DC voltage from the fuel cell 304*a*, 304*b* with the lowest electric energy generation capacity.

In block 806, the control device may control the voltage source inverters 308*a*, 308*b* to output a controlled amount of AC voltage to the microgrid side bus 318. The controlled amount of AC voltage may be based on the control the voltage source inverters 308*a*, 308*b* in block 804.

In block 408, the control device may measure a voltage at the grid side bus 314. In block 410, the control device may control the current source inverters 302*a*, 302*b* to output excess electric energy to the grid side bus 314. In determination block 412, the control device may determine whether the electric utility power grid is available. In response to determining that the electric utility power grid is available (i.e., determination block 412="Yes"), the control device may continue to steps "A" in FIG. 8B. In response to determining that the electric utility power grid is not available (i.e., determination block 412="No"), the control device may continue to steps "B" in FIG. 8C.

Referring to FIG. 8B, in response to determining that the electric utility power grid is available (i.e., determination block 412="Yes"), the control device may determine whether the fuel cell system based microgrid 700 is connected to the electric utility power grid in determination block 420. In response to determining that the fuel cell system based microgrid 700 is not connected to the electric utility power grid (i.e., determination block 420="No"), the control device may electrically disconnect the grid side bus 314 from the microgrid side bus 318 via the transmission bus 316*f* and electrically connect the grid side bus 314 to the electric utility power grid in block 808. The control device may control the transfer switch 312 to change states or positions to electrically connect the grid side bus 314 to the electric utility power grid and to electrically disconnect the grid side bus 314 from the microgrid side bus 318 via the transmission bus 316*d*.

In response to determining that the fuel cell system based microgrid 700 is connected to the electric utility power grid (i.e., determination block 420="Yes") or following block 808, the control device may determine whether there is reverse power flow on the transmission bus 316*f* in determination block 810. In some examples, the control device may detect reverse power flow on the transmission bus 316*f* by receiving a signal from a relay 702 configured to indicate to the control device the presence of the reverse flow. Reverse power flow may occur is the load electric energy (e.g., power) demand is less than the total electric energy (e.g., power) provided by the voltage source inverters 308*a*, 308*b* to the microgrid side bus 318. In contrast, if the load electric energy (e.g., power) demand is greater than the total electric energy (e.g., power) provided by the voltage source inverters 308*a*, 308*b*, then no reverse power flow occurs on the transmission bus 316*f* because additional electric energy (e.g., power) is drawn by the load from the current source inverters 302*a*, 302*b* and/or from the electric utility power grid.

In response to determining that there is no reverse power flow on the transmission bus 316*f* (i.e., determination block 810="No"), the control device may control the current source inverters 302*a*, 302*b* in block 812. The control device may control the control the current source inverters 302*a*, 302*b* to provide electric energy from the fuel cells 304*a*, 304*b* to the microgrid side bus 318 via the grid side bus 314 and the transmission bus 316*f*. The electric energy may include AC current output to the grid side bus 318 by the current source inverters 302*a*, 302*b* as described herein with reference to block 410. The control device may control the current source inverters 302*a*, 302*b*, for example, by signaling to control the current source inverters 302*a*, 302*b* or directly setting the current source inverters 302*a*, 302*b* to set points for current output. The set points for current output may be based on an amount of current needed, in addition to the voltage at the microgrid side bus 318, to satisfy the load demand based on a volt-watt curve.

In block 814, the control device may control the electrical contactor 704 to close to electrically connect the grid side bus 314 to the microgrid side bus 318 via the transmission bus 316*f*. In other words, if the load power demand is below the power output of the voltage source inverters 308*a*, 308*b*, then the contactor 704 is closed to provide the excess power from the current source inverters 302*a*, 302*b* to the load via the grid side bus 314, the transmission bus 316*f* and the microgrid side bus 318 to satisfy the load power demand.

In response to determining that there is reverse flow on the transmission bus 316*f* (i.e., determination block 810="Yes"), the control device may control the electric contactor 704 to open to prevent the reverse flow on the transmission bus 316*f* in block 816. The control device may control the electrical contactor 704 to change states or positions (i.e., to open) to electrically disconnect the grid side bus 314 from the microgrid side bus 318 via the transmission bus 316*f*. In other words, if the load power demand is lower than the power output of the voltage source inverters 308*a*, 308*b*, then the contactor 704 is opened to prevent reverse power flow from the microgrid bus 318 to the utility electric power grid.

Following block 814 or block 816, the control device may control export of excess electric energy at the grid side bus 314 to the electric utility power grid in block 432. The control device may continue to measure the voltage at the microgrid side bus 318 in block 802.

Referring to FIG. 8C, in response to determining that the electric utility power grid is not available (i.e., determination block 412="No"), the control device may determine whether the fuel cell system based microgrid 700 is connected to the electric utility power grid in determination block 440. In response to determining that the fuel cell system based microgrid 700 is connected to the electric utility power grid (i.e., determination block 440="Yes"), the control device may electrically connect the grid side bus 314 to the microgrid side bus 318 via transmission bus 316*d* and electrically disconnect the grid side bus 314 from the electric utility power grid in block 818.

The control device may control the transfer switch 312 to change states or positions to electrically connect the grid side bus 314 to the microgrid side bus 318 via transmission bus 316*d* and electrically disconnect the electrically connect the grid side bus 314 from the electric utility power grid. The control device may control the electrical contactor 704 to change states or positions (i.e., to open) to electrically disconnect the grid side bus 314 from the microgrid side bus 318 via the transmission bus 316f.

In response to determining that the fuel cell system based microgrid 700 is not connected to the electric utility power grid (i.e., determination block 440="No") or following block 818, the control device may determine whether the voltage at the microgrid side bus 318 is sufficient to support the load in determination block 444. In response to determining that the voltage at the microgrid side bus 318 is not sufficient to support the load (i.e., determination block 444="No"), the control device may control the current source inverters 302a, 302b in block 446. In block 448, the control device may control the current source inverters 302a, 302b to output a controlled amount of AC current to the microgrid side bus 318 via the grid side bus 314. In response to determining that the voltage at the microgrid side bus 318 is sufficient to support the load (i.e., determination block 444="Yes") or following block 448, the control device may continue to measure the voltage at the microgrid side bus 318 in block 802.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device as well as controllers 320 described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Fuel cell systems of the embodiments of the present disclosure are designed to reduce greenhouse gas emissions and have a positive impact on the climate.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

The invention claimed is:

1. A microgrid, comprising:
a plurality of direct current (DC) power sources;
a plurality of voltage source inverters, wherein a DC end of each of the plurality of voltage source inverters is electrically connected to a respective DC power source of the plurality of DC power sources;
a microgrid side bus, wherein an alternating current (AC) end of each of the plurality of voltage source inverters is electrically connected to the microgrid side bus, and the microgrid side bus is configured to be electrically connected to a load;
a plurality of current source inverters, wherein a DC end of each of the plurality of current source inverters is electrically connected to a respective DC power source of the plurality of DC power sources;

a grid side bus, wherein an AC end of each of the plurality of current source inverters is electrically connected to the grid side bus;
a transfer switch configured to control a selective electrical connection of the grid side bus to an electric utility power grid or to the microgrid side bus; and
a transmission bus electrically connected between the microgrid side bus and the grid side bus.

2. The microgrid of claim 1, wherein the plurality of direct current (DC) power sources comprise a plurality of fuel cell stacks.

3. The microgrid of claim 2, wherein:
the plurality of voltage source inverters are configured to output approximately equal amounts of AC voltage to the microgrid side bus, wherein a maximum output of AC voltage of each of the plurality of voltage source inverters is based on a lowest generation capacity of any of the plurality of fuel cell stacks; and
the plurality of current source inverters are configured to output an AC current to the grid side bus from DC current generated by any of the plurality of fuel cell stacks in excess of the lowest generation capacity.

4. The microgrid of claim 1, further comprising:
a rectifier electrically connected to the grid side bus via the transmission bus; and
an additional current source inverter located on the transmission bus and electrically connected to the rectifier at its DC end, and electrically connected to the microgrid side bus at its AC end.

5. The microgrid of claim 4, wherein the rectifier and the additional current source inverter are configured to use a first AC current from the grid side bus to provide a second AC current to the microgrid side bus when the transfer switch selectively electrically connects the grid side bus to the electric utility power grid.

6. The microgrid of claim 1, further comprising:
a motor electrically connected to the grid side bus via the transmission bus; and
a generator electrically connected to the motor and driven by the motor, and electrically connected to the microgrid side bus via the transmission bus.

7. The microgrid of claim 6, wherein the motor and the generator are configured to use a first AC current from the grid side bus to provide a second AC current to the microgrid side bus when the transfer switch selectively electrically connects the grid side bus to the electric utility power grid.

8. The microgrid of claim 1, further comprising:
an electric contactor configured to selectively electrically complete a circuit along the transmission bus between the grid side bus and the microgrid side bus, and configured to selectively electrically interrupt the circuit along the transmission bus between the grid side bus and the microgrid side bus; and
a control device electrically connected to the transmission bus and configured to detect current flow and to signal the electric contactor to complete or interrupt the circuit in response to detecting a flow of current from the microgrid side bus to the grid side bus.

9. The microgrid of claim 8, wherein the transfer switch and the electric contactor are interlocked such that when the transfer switch selectively electrically connects the grid side bus to the microgrid side bus in response to the electric utility power grid being unavailable, the electric contactor selectively electrically interrupts the circuit along the transmission bus between the grid side bus and the microgrid side bus, and when the electric contactor selectively electrically interrupts the circuit along the transmission bus between the grid side bus and the microgrid side bus in response to a flow of a reverse current from the microgrid side bus to the grid side bus, the transfer switch selectively electrically connects the grid side bus to the microgrid side bus.

10. The microgrid of claim 1, wherein:
the transfer switch is further configured to selectively electrically connect of the grid side bus to the microgrid side bus and selectively electrically disconnect the grid side bus from the electric utility power grid in response to the electric utility power grid being unavailable; and
the plurality of current source inverters are configured to output AC current to the microgrid side bus via the grid side bus when the transfer switch selectively electrically connects the grid side bus to the microgrid side bus.

11. A method of operating a microgrid, comprising:
providing electric energy from each of a plurality of DC power sources to a respective one of a plurality of voltage source inverters and to a respective one of a plurality of current source inverters;
outputting a voltage by the plurality of voltage source inverters to the microgrid side bus such that each of the plurality of voltage source inverters outputs approximately equal amounts of voltage to the microgrid side bus, wherein a maximum output of voltage of each of the plurality of voltage source inverters is based on a lowest generation capacity of one of the plurality of DC power sources;
outputting a first current by the plurality of current source inverters to a grid side bus based on an amount of current generated by the plurality of DC power sources in excess of the lowest generation capacity; and
using the first current output to the grid side bus to provide a second current to the microgrid side bus.

12. The method of claim 11, further comprising:
determining whether the voltage satisfies a load demand; and
in response to determining that the voltage does not satisfy the load demand:
drawing the first current from the grid side bus by a rectifier;
outputting a third current from the rectifier to an additional current source inverter; and
outputting the second current from the additional current source inverter to the microgrid side bus.

13. The method of claim 12, further comprising:
determining whether an electric utility power grid is available; and
selectively electrically connecting the grid side bus to the electric utility power grid in response to determining that the electric utility power grid is available, wherein drawing the first current from the grid side bus and outputting the second current to the microgrid side bus occur in response to the grid side bus being selectively electrically connected to the electric utility power grid.

14. The method of claim 11, wherein using the first current output to the grid side bus to provide the second current to the microgrid side bus comprises:
determining whether the voltage satisfies a load demand; and
in response to determining that the voltage does not satisfy the load demand:
drawing the first current from the grid side bus to drive a motor;
driving a generator using the motor; and
outputting the second current from the generator to the microgrid side bus.

15. The method of claim 14, further comprising:

determining whether an electric utility power grid is available;

selectively electrically connecting the grid side bus to the electric utility power grid in response to determining that the electric utility power grid is available, wherein drawing the first current from the grid side bus and outputting the second current to the microgrid side bus occur in response to the grid side bus being selectively electrically connected to the electric utility power grid.

16. The method of claim 11, wherein using the first current output to the grid side bus to provide the second current to the microgrid side bus comprises:

determining whether the voltage satisfies a load demand; and in response to determining that the voltage does not satisfy the load demand, closing a contactor to electrically connect the grid side bus to the microgrid side bus and to form a circuit between the grid side bus and the microgrid side bus.

17. The method of claim 16, further comprising:

detecting a reverse current flow from the microgrid side bus to the grid side bus; and opening the contactor to electrically interrupt the circuit between the grid side bus and the microgrid side bus in response to detecting the reverse current flow.

18. The method of claim 17, further comprising electrically disconnecting the grid side bus from the electric utility power grid and electrically connecting the grid side bus to the microgrid side bus, in response to opening the contactor.

19. The method of claim 11, further comprising:

determining whether an electric utility power grid is available; and in response to the electric utility power grid being unavailable:

electrically disconnecting the grid side bus from the electric utility power grid; and electrically connecting the grid side bus to the microgrid side bus.

20. The method of claim 11, wherein the plurality of DC power sources comprise fuel cell power sources.

* * * * *